(12) United States Patent
Asakura et al.

(10) Patent No.: US 10,328,951 B2
(45) Date of Patent: Jun. 25, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masahiko Asakura, Wako (JP); Kunimichi Hatano, Wako (JP); Naoto Sen, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 15/490,997

(22) Filed: Apr. 19, 2017

(65) Prior Publication Data

US 2017/0313325 A1 Nov. 2, 2017

(30) Foreign Application Priority Data

May 2, 2016 (JP) .................................. 2016-092512

(51) Int. Cl.
*B60R 1/00* (2006.01)
*G05D 1/02* (2006.01)
(Continued)

(52) U.S. Cl.
CPC ............... *B60W 50/12* (2013.01); *B60R 1/00* (2013.01); *B60W 30/12* (2013.01); *B60W 30/143* (2013.01); *B60W 30/16* (2013.01); *B60W 50/14* (2013.01); *G05D 1/0248* (2013.01); *B60K 2350/102* (2013.01); *B60K 2350/1004* (2013.01); *B60K 2350/106* (2013.01);
(Continued)

(58) Field of Classification Search
None
See application file for complete search history.

(56) References Cited

U.S. PATENT DOCUMENTS

2017/0052540 A1* 2/2017 Lokesh ................. B60W 30/16
2017/0053534 A1* 2/2017 Lokesh ............... B60W 30/165
2017/0167604 A1* 6/2017 Song ................... F16H 59/0204

FOREIGN PATENT DOCUMENTS

JP 61-215167 A 9/1986
JP 2007-199939 A 8/2007
(Continued)

OTHER PUBLICATIONS

Office Action dated Feb. 27, 2018, issued in counterpart Japanese Application No. 2016-092512, with English machine translation. (9 pages).
(Continued)

*Primary Examiner* — Rami Khatib
(74) *Attorney, Agent, or Firm* — Westerman, Hattori, Daniels & Adrian, LLP

(57) ABSTRACT

A vehicle control system includes an automated driving controller configured to execute automated driving of a vehicle by automatically performing at least one of speed control and steering control of the vehicle, an operation reception section configured to receive an operation to switch a shift position of the vehicle, and an operation controller configured to limit reception, by the operation reception section, of the operation to switch the shift position while the automated driving is being executed by the automated driving controller.

17 Claims, 18 Drawing Sheets

(51) Int. Cl.
| | |
|---|---|
| *B60W 30/12* | (2006.01) |
| *B60W 30/14* | (2006.01) |
| *B60W 30/16* | (2012.01) |
| *B60W 50/12* | (2012.01) |
| *B60W 50/14* | (2012.01) |

(52) U.S. Cl.
CPC ............ *B60K 2350/1024* (2013.01); *B60K 2350/1048* (2013.01); *B60K 2350/2013* (2013.01); *B60K 2350/2052* (2013.01); *B60K 2350/921* (2013.01); *B60R 2300/105* (2013.01); *B60R 2300/107* (2013.01); *B60R 2300/205* (2013.01); *B60R 2300/301* (2013.01); *B60W 2050/146* (2013.01); *B60W 2510/18* (2013.01); *B60W 2510/202* (2013.01); *B60W 2520/105* (2013.01); *B60W 2520/14* (2013.01); *B60W 2540/16* (2013.01); *B60W 2710/18* (2013.01); *B60W 2710/20* (2013.01); *B60W 2720/106* (2013.01)

(56) References Cited

FOREIGN PATENT DOCUMENTS

| | | |
|---|---|---|
| JP | 2012-1121 A | 1/2012 |
| JP | 2012-51441 A | 3/2012 |
| JP | 2016-45856 A | 4/2016 |
| WO | 2015/056530 A1 | 4/2015 |
| WO | 2016/002145 A1 | 1/2016 |

OTHER PUBLICATIONS

Office Action dated Aug. 28, 2018, issued in counterpart Japanese Application No. 2016-092512, with English translation (7 pages).

\* cited by examiner

188

| DRIVING MODE<br>NON-DRIVING<br>OPERATION SYSTEM | MANUAL DRIVING MODE | AUTOMATED DRIVING MODE | | | ... |
|---|---|---|---|---|---|
| | | MODE A | MODE B | MODE C | |
| NAVIGATION OPERATION | NOT PERMITTED | PERMITTED | PERMITTED | NOT PERMITTED | ... |
| CONTENT PLAYBACK OPERATION | NOT PERMITTED | PERMITTED | NOT PERMITTED | NOT PERMITTED | ... |
| INSTRUMENT PANEL OPERATION | NOT PERMITTED | PERMITTED | PERMITTED | PERMITTED | ... |
| ... | ... | ... | ... | ... | ... |

FIG. 21A
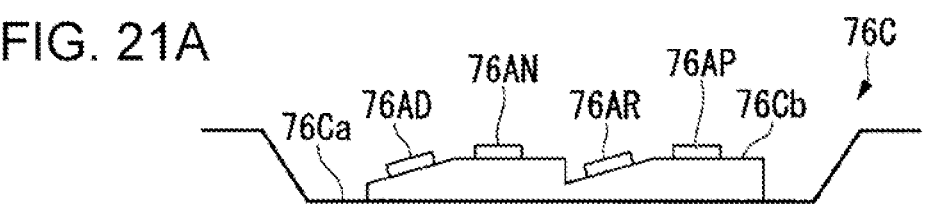
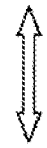
FIG. 21B
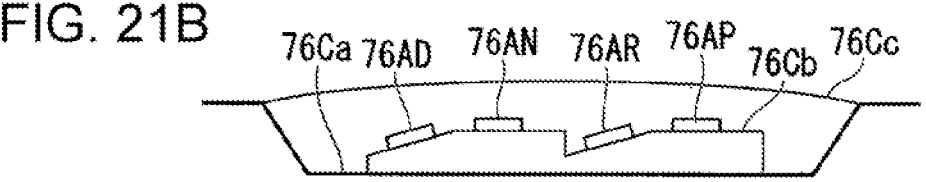
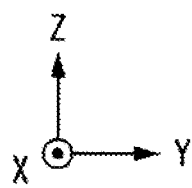

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-032512, filed May 2, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

Recently, research is progressing into technology for automatically controlling at least one out of acceleration/deceleration or steering of a vehicle such that the vehicle travels along a route to a destination (referred to as "automated driving" hereafter). In relation thereto, technology for switching from manual driving to automated driving in cases in which driver override is not detected is known (for example, see Japanese Unexamined Patent Application Publication No. 2012-51441).

However, although operations on steering, a brake pedal, and an accelerator pedal are detected in order to detect an override in Japanese Unexamined Patent Application Publication. No. 2012-51441, since operation of a shift lever is not detected, there is a possibility of mistaken operation of the shift lever by a vehicle occupant.

SUMMARY

The present disclosure describes a vehicle control system, a vehicle control method, and a vehicle control program capable of suppressing mistaken operation by an occupant with regards to a shift position.

A first aspect of the present disclosure describes a vehicle control system including an automated driving controller configured to execute automated driving by automatically performing at least one of speed control or steering control of a vehicle; an operation reception section configured to receive an operation to switch a shift position; and an operation controller configured to limit reception, by the operation reception section, of an operation to switch a shift position while automated driving is being executed by the automated driving controller.

A second aspect of the present disclosure describes the vehicle control system of the first aspect, further including a drive section configured to transmit, to a transmission of the vehicle, an operation to switch to a shift position received by the operation, reception section. In the second aspect, the operation controller prohibits action of the drive section in cases in which an operation has been received by the operation reception section while automated driving is being executed by the automated driving controller.

A third aspect of the present disclosure describes the vehicle control system of the first aspect, further including a shift position detection section configured to electrically detect an operation to switch a shift position of the operation reception section. In the third aspect, the operation controller prohibits detection, by the shift-position detection section, of an operation to switch a shift position while automated driving is being executed by the automated driving controller.

A fourth aspect of the present disclosure describes the vehicle control system of any one of the first aspect to the third aspect, wherein the operation reception section includes an operation section operated by an occupant, and a shielding mechanism that shields at least a portion of the operation section from sight. In the fourth aspect, the operation controller activates the shielding mechanism while reception of operations to switch a shift position is limited.

A fifth, aspect of the present disclosure describes the vehicle, control system, of the fourth aspect, wherein the automated driving controller starts the automated driving when operation by the shielding mechanism to shield the operation section has been completed.

A sixth aspect of the present disclosure describes the vehicle control system of the fourth aspect or the fifth aspect, further including a shift position detection section configured to electrically detect an operation to switch a shift position of the operation reception section. In the sixth aspect, the operation controller shields at least a portion of the operation section when the shift position detected by the shift position detection section is a driving position, and does not shield the at least a portion of the operation section when the shift position detected by the shift position detection section is a park position.

A seventh aspect of the present disclosure describes the vehicle control system of any one of the fourth aspect to the sixth aspect, further including an action plan generation section configured to generate a segment where automated driving is to be executed by the automated driving controller. In the seventh aspect, the operation controller is configured to start an action to use the shielding mechanism to shield the at least a portion of the operation section when the vehicle reaches a starting point, set by the action plan generation section, of a segment, where automated driving is to be executed.

An eighth aspect of the present disclosure describes the vehicle control system of the seventh aspect, wherein the operation controller uses the shielding mechanism to expose the operation section, of which the at least a portion is being shielded by the shielding mechanism, when the vehicle passes an ending point, set by the action plan generation section, of a segment where automated driving is to be executed.

A ninth aspect of the present disclosure describes the vehicle control system of any one of the fourth aspect to the sixth aspect, further including an automated driving notification section configured to perform notification of a start of automated driving by the automated driving controller; and a detection section configured to detect an operation by the operation controller to shield or expose using the shielding mechanism. In the ninth aspect, the operation controller is configured to start an action to use the shielding mechanism to shield the at least a portion of the operation section when an operation to shield the operation section has been detected by the detection section in a state in which notification of a start of automated driving is being performed by the automated driving notification section.

A tenth aspect of the present disclosure describes the vehicle, control system of the ninth aspect, further including an operation notification section configured to perform notification prompting operation to shield the operation section prior to the vehicle reaching a starting point, of a segment where automated driving is to be executed.

An eleventh aspect of the present disclosure describes the vehicle control system of the ninth aspect, wherein in cases in which operation to expose the at least a portion of the operation section has been detected by the detection section while automated driving is being executed by the automated driving controller: the operation controller uses the shielding mechanism to expose the at least a portion of the operation section being shielded, and the automated driving controller suspends execution of automated driving and switches at least one of speed control or steering control of the vehicle to manual driving executed based on driving operations by a vehicle occupant.

A twelfth aspect, of the present, disclosure describes the vehicle control system of the ninth aspect, wherein the operation controller uses the shielding mechanism to expose the operation section when an operation to shield the at least, a portion of the operation section has been detected by the detection section while a position of the vehicle is outside a segment where automated driving is to be executed.

A thirteenth aspect of the present disclosure describes a vehicle; control method executed, by an on board computer. The method includes limiting reception of an operation to switch a shift position while executing automated driving by automatically performing at least one of speed control or steering control of a vehicle.

A fourteenth aspect of the present disclosure describes a vehicle control program for causing an on-board computer to execute processing. The processing includes limiting reception of an operation to switch a shift position while executing automated driving by automatically performing at least one of speed control or steering control of a vehicle.

For example, the first, second, third, fourth, fifth, seventh, eighth, thirteenth, and fourteenth aspects of the present disclosure enable mistaken operation by an occupant relating to a shift position to be suppressed.

For example, the sixth aspect of the present disclosure enables shielding of the operation section to be prohibited in situations in which the operation section is to be operated, such as when the vehicle is stopped.

For example, the ninth and tenth aspects of the present disclosure enable an operation on the operation section to be prompted, enabling to suppress occupant unease with regards to the shielding of the operation section.

For example, the eleventh aspect of the present disclosure enables switching from an automated driving mode to a manual driving mode to be implemented by an operation to expose the operation section.

For example, the twelfth aspect of the present disclosure enables an operation counterforce to be imparted to the hand of the occupant when an operation is performed on the operation section outside of a segment where it is possible to switch from manual driving to automated driving.

BRIEF DESCRIPTION OF THE DRAWINGS

The advantages of the disclosure will become apparent in the following description taken in conjunction with the following drawings.

FIG. 12A is a side view and FIG. 12B is a top-down view.

FIGS. 21A and 21B are side views illustrating a second modified example: FIG. 21A illustrates a state in which operation switches are exposed, and FIG. 21B illustrates a state in which operation switches are shielded.

FIG. 22A illustrates a state in which operation buttons are exposed on a shift operation screen, and FIG. 22B illustrates a state in which operation buttons are shielded on a shift operation screen.

DETAILED DESCRIPTION

Explanation follows regarding an embodiment of a vehicle control system, a vehicle control method, and a vehicle control program of the present disclosure, with reference to the drawings.

Common Configuration

Figure 1:
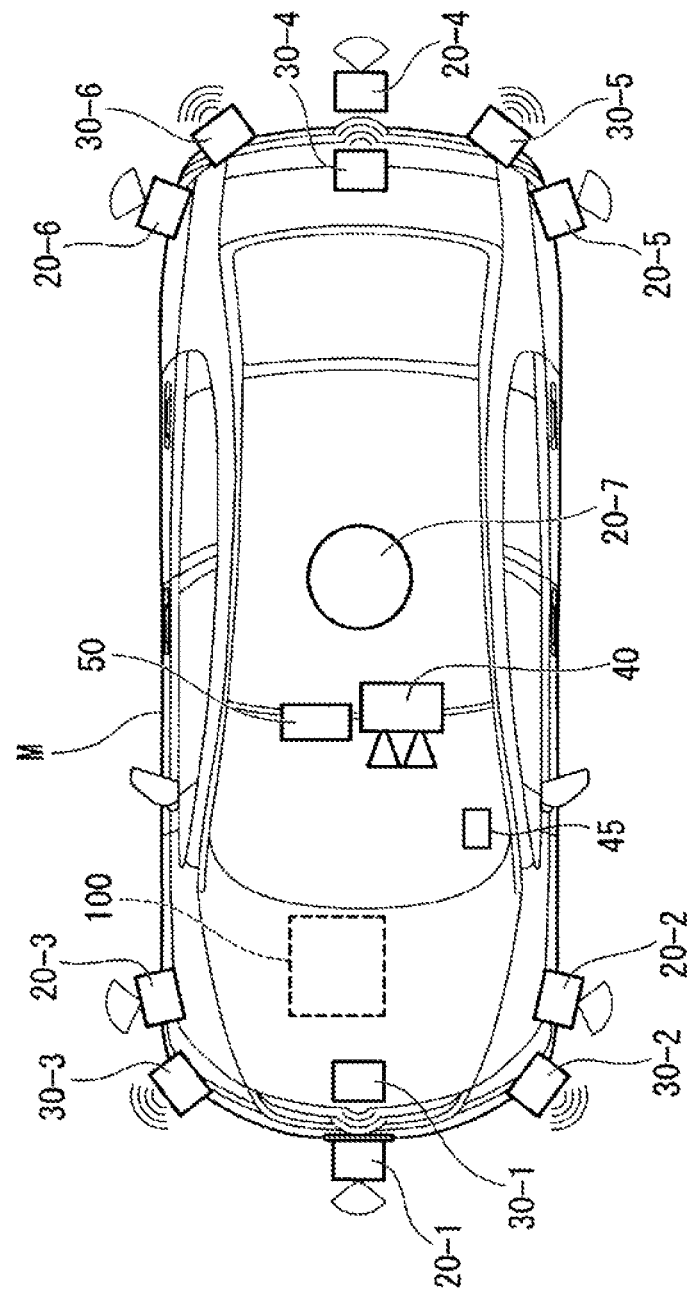
FIG. 1 is a diagram illustrating configuration elements of a vehicle.

FIG. 1 is a diagram illustrating configuration elements of a vehicle (referred to as the vehicle M hereafter) installed with a vehicle control system 100. The vehicle installed with the vehicle control system 100 is, for example, a two-wheeled, three-wheeled, or four-wheeled automobile, and this encompasses automobiles having an internal combustion engine such as a diesel engine or gasoline engine as a power source, electric automobiles having an electric motor as a power source, and hybrid automobiles having both an internal combustion engine and an electric motor. Electric automobiles are, for example, driven using electric power discharged from a battery such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40; a navigation device 50; and the vehicle control system 100 are installed to the vehicle M.

The finders 20-1 to 20-7 are, for example, LIDARs (Light Detection and Ranging, or Laser Imaging Detection and Ranging) that measure the scattering of emitted light and measure, the distance to a target. For example, the finder 20-1 is attached to a front grille or the like, and the finder 20-2 and the finder 20-3 are attached to a side face of a vehicle body, a door mirror, a front headlamp interior, the vicinity of a side lamp, or the like. The finder 20-4 is attached to a trunk lid or the like, the finder 20-5 and the finder 20-6 are attached to a side face of the vehicle body, a tail light interior, or the like. The finders 20-1 to 20-6 described above have detection regions of, for example, approximately 150° in a horizontal direction. The finder 20-7 is attached to a roof or the like. The finder 20-7 has a detection region of, for example, 360° in the horizontal direction.

The radar 30-1 and the radar 30-4 are, for example, long-range millimeter wave radars having a wider detection region in a depth direction than the other radars. The radars 30-2, 30-3, 30-5, 30-6 are intermediate-range millimeter wave radars having a narrower detection region in the depth direction than the radars 30-1 and 30-4.

Hereafter, the finders 20-1 to 20-7 are simply referred to as "finders 20" in cases in which no particular distinction is made, and the radars 30-1 to 30-6 are simply referred to as "radars 30" in cases in which no particular distinction is made. The radars 30, for example, detect objects using a frequency modulated continuous wave (FM-CW) method.

The camera 40 is, for example, a digital camera that employs a solid state imaging element such as a charge coupled device (CCD) or a complementary metal oxide semiconductor (CMOS) element. The camera 40 is attached to a front windshield upper portion, a back face of a rear-view mirror, or the like. The camera 40, for example, periodically and repeatedly images ahead of the vehicle M. The camera 40 may be a stereo camera that includes plural cameras.

Note that the configuration illustrated in FIG. 1 is merely an example; a portion of the configuration may be omitted, and other configuration may be further added.

First Embodiment

Figure 2:
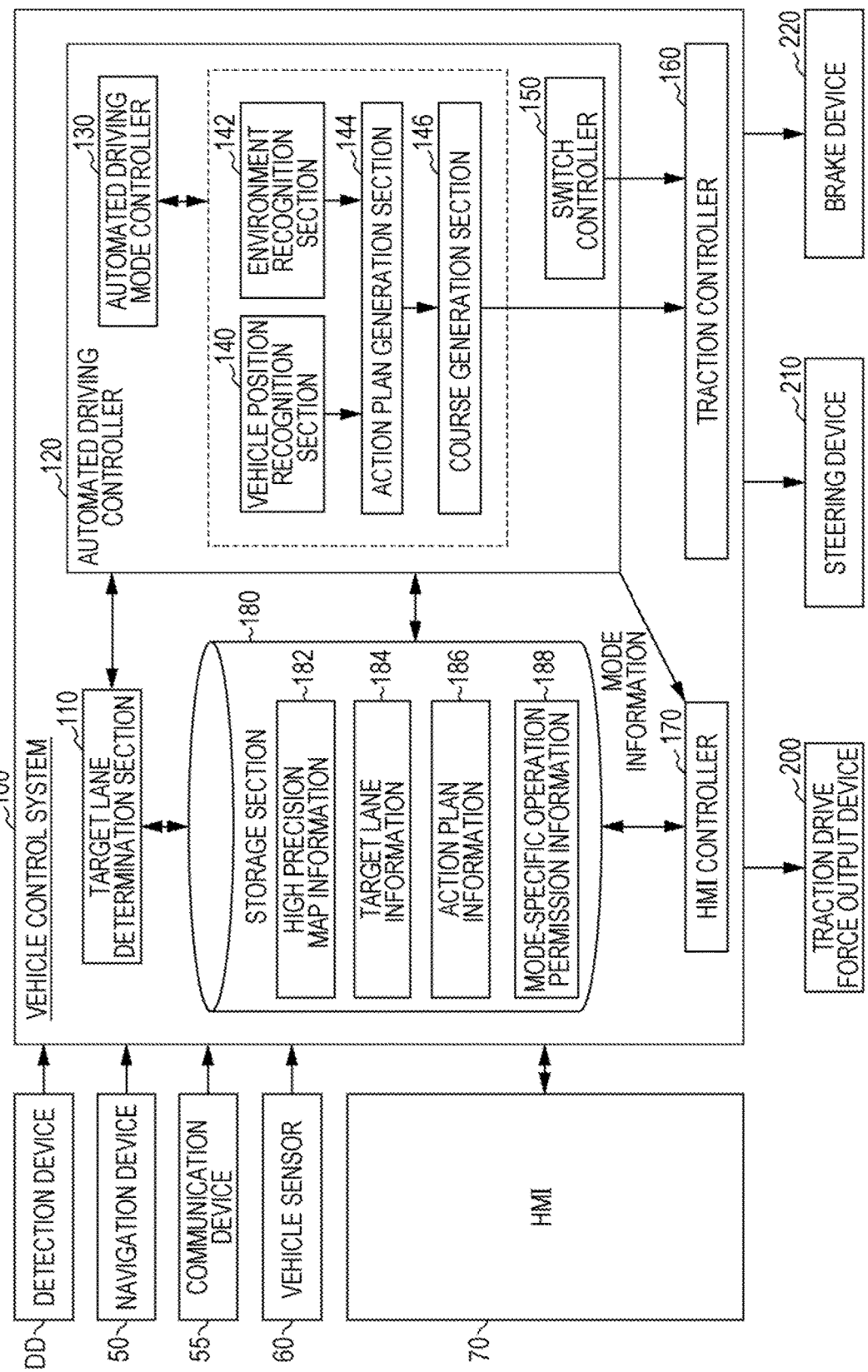
FIG. 2 is a functional configuration diagram focusing on a vehicle control system.

FIG. 2 is a functional configuration diagram focusing on the vehicle control system 100. Detection devices DD that include the finders 20, the radars 30, the camera 40, and the like; the navigation device 50; a communication device 55; vehicle sensors 60; a human machine interface (HMI) 70; the vehicle control system 100; a traction drive force output device 200; a steering device 210; and a brake device 220 are installed in the vehicle M. These devices and apparatuses are connected to one another by a multiplex communication line such as a controller area network (CAM) communication line, or by a wireless communication network, a serial communication line, or the like. Note that the vehicle control system within the scope of the claims does not indicate only the "vehicle control system 100" and may include configuration other than that of the vehicle control system 100 (such as the detection devices DD and the HMI 70).

The navigation device 50 includes a global navigation satellite system (GNSS) receiver, map information (a navigation map), a touch panel display device that functions as a user interface, a speaker, a microphone, and the like. The navigation device 50 identifies the position of the vehicle M using the GNSS receiver and derives a route from this position to a destination designated by a user. The route derived by the navigation device 50 is provided to a target lane determination section 110 of the vehicle control system 100. The position of the vehicle M may be identified or complemented by an inertial navigation system (INS) employing output from the vehicle sensors 60. When the vehicle control system 100 is executing a manual driving mode, the navigation device 50 provides guidance along a route to the destination using audio and a navigation display. Note that configuration for identifying the position of the vehicle M may be provided independently front the navigation device 50. Moreover, the navigation device 50 may, for example, be implemented by functionality of a terminal device such as a smartphone or a tablet terminal possessed by the user. In such cases, information is exchanged between the terminal device and the vehicle control system 100 using wireless or wired communication.

The communication device 55, for example, performs wireless communication using dedicated short range communication (DSRC) or the like. Note that the communication device 55 may communicate with a terminal device via a cellular network, a Wi-Fi network, or Bluetooth (registered trademark).

The vehicle sensors 60 include, for example, a vehicle speed sensor that detects vehicle speed, an acceleration sensor that detects acceleration, a yaw rate sensor that detects angular velocity about a vertical axis, and a directional sensor that detects the heading of the vehicle M.

Figure 3:
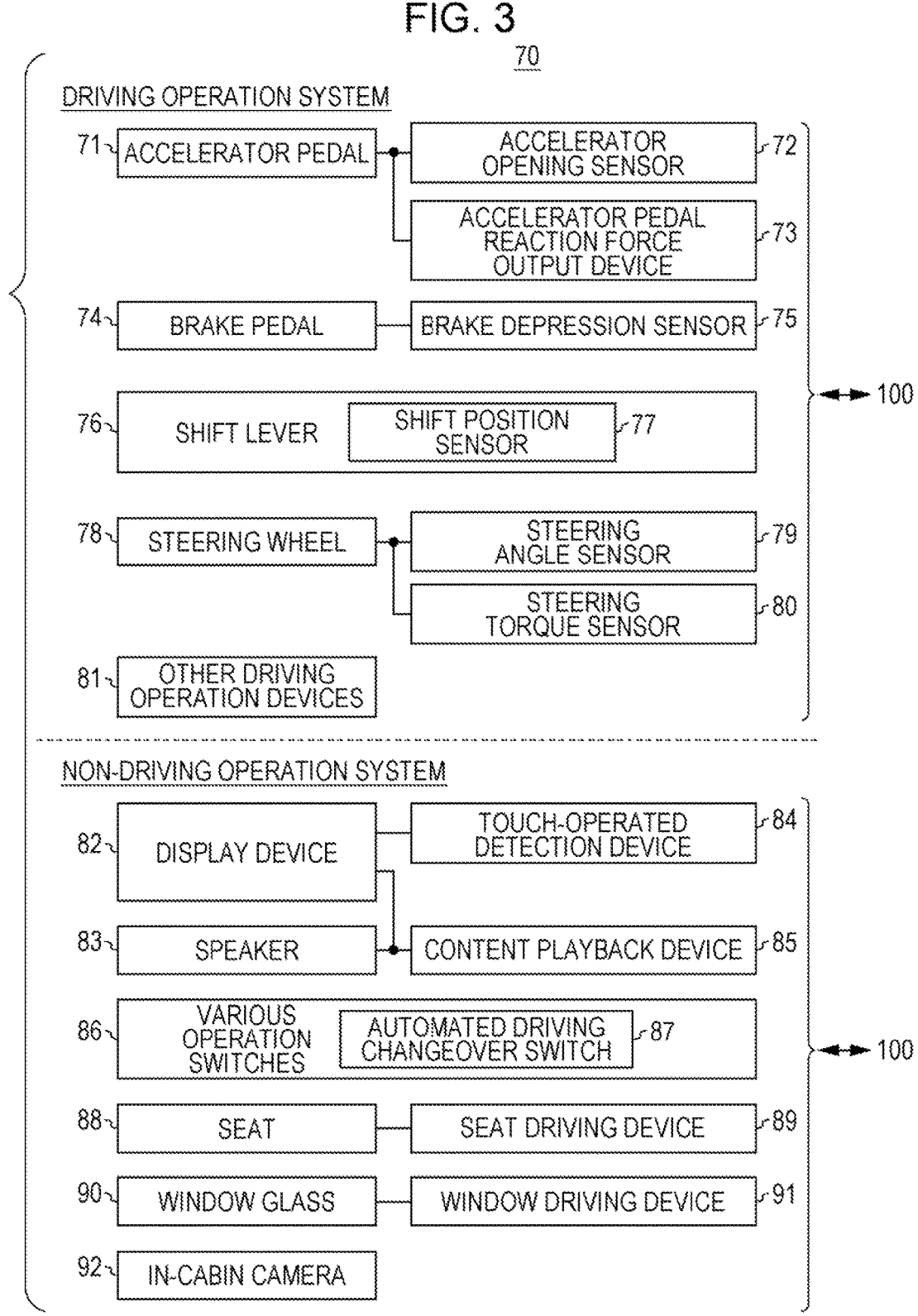
FIG. 3 is a configuration diagram of an HMI.

FIG. 3 is a configuration diagram of the HMI 70. The HMI 70 is provided with, for example, driving operation system configuration and non-driving operation system configuration. There is no clear boundary between the two, and driving operation system configuration may provide non-driving operation system functionality (or vise-versa).

As configuration of the driving operation system, the HMI 70 includes, for example, an accelerator pedal 71, an accelerator opening sensor 72 and an accelerator pedal reaction force output device 73, a brake pedal 74 and a brake depression sensor (or a master pressure sensor or the like) 75, a shift lever device 76 and a shift position sensor 77, a steering wheel 78, a steering angle sensor 79 and a steering torque sensor 80, and other driving operation devices 81.

The accelerator pedal 71 is an operation element for receiving acceleration instructions from a vehicle occupant (or deceleration instructions due to return-operation). The accelerator opening sensor 72 detects a depression amount of the accelerator pedal 71, and outputs an accelerator opening signal indicating the depression amount to the vehicle control system 100. Note that output may be made directly to the traction drive force output device 200, the steering device 210, or the brake device 220 instead of outputting to the vehicle control system 100. Similar applies for other configuration of the driving operation system explained below. The accelerator pedal reaction force output device 73, for example, outputs force (an operation reaction force) in the opposite direction to the operation direction of the accelerator pedal 71, according to instructions from the vehicle control system 100.

The brake pedal 74 is an operation element for receiving deceleration instructions from the vehicle occupant. The brake depression sensor 75 detects a depression amount or (alternatively, the pressing force on) the brake pedal 74 and outputs a brake signal indicating the detection result to the vehicle control system 100.

The shift lever device 76 includes a shift lever as an operation element for receiving shift level change instructions from the vehicle occupant. The shift lever device 76 is an example of an operation reception section that receives an operation to switch a shift position. The shift position sensor 77 detects the shift level instructed by the vehicle occupant and outputs a shift position signal indicating the detection result to the vehicle control system 100. Note that the shift lever device 76 may instead be understood to be a shift device in cases in which the operation section is not a lever type operation section.

The steering wheel 78 is an operation element for receiving turning instructions from the vehicle occupant. The steering angle sensor 79 detects the steering angle of the steering wheel 78 and outputs a steering angle signal indicating the detection result to the vehicle control system 100. The steering torque sensor 80 detects the torque placed on the steering wheel 78 and outputs a steering torque signal indicating the detection result to the vehicle control system 100.

The other driving operation devices 81 are, for example, a joystick, a button, a dial switch, a graphical user interface (GUI) switch, and the like. The other driving operation, devices 81 receive acceleration instructions, deceleration instructions, turning instructions, and the like and output the instructions to the vehicle control system 100.

As configuration of the non-driving operation system, the HMI 70 includes, for example, a display device 82, a speaker 83, a touch-operated detection device 84 and a content playback device 85, various operation switches 86, a seat 88 and a seat driving device 89, window glass 90 and a window driving device 91, and an in-cabin camera 95.

The display device 82 is a display device visible to the occupant in the vehicle cabin. The display device 82 is, for example, a liquid crystal display (LCD), an organic electroluminescent (EL) display device, or the like attached to a respective section of an instrument panel, a freely selected location facing the front passenger seat and rear-seat, or the like. Moreover, the display device 82 may be a head-up display (HUD) that projects an image onto the front-windshield or another window so as to be visible from inside the vehicle cabin.

In cases in which an in-cabin display 82A is a touch panel, the touch-operated detection device 84 detects contact positions (touched positions) on the display screen of the in-cabin display 82A and outputs the contact positions to the vehicle control system 100. Note that in cases in which, the in-cabin display 82A is not a touch panel, the touch-operated detection device 84 may be omitted.

The speaker 83 outputs audio. The speaker 83 emits sounds in the vehicle cabin. The speaker 83 is a speaker installed in the vehicle cabin and that emits sound in the vehicle cabin.

The content playback device 85 includes, for example, a digital versatile disc (DVD) playback device, a compact disc (CD) playback device, a television receiver, various guidance image generation devices, and the like. Some or all out of the display device 82, the speaker 83, the touch-operated detection device 84, and the content playback device 85 may be configured so as to be shared with the navigation device 50.

The various operation switches 86 are disposed at freely selected locations inside the vehicle cabin. The various operation switches 86 include an automated driving changeover switch 87 for instructing automated driving to start (or to start in the future) or stop. The automated driving changeover switch 87 may be a graphical user interface (GUI) switch or a mechanical switch. Moreover, the various operation switches 86 may include a switch for driving the seat driving device 89 or window driving device 31.

The seat 88 is a seat in which the vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 90.

The in-cabin camera 95 is a digital camera that employs a solid state imaging element such as a CCD or a CMOS element. The in-cabin camera 95 is attached to a position from which at least the head of the vehicle occupant performing driving operation can be imaged, such as the rear-view mirror, steering wheel boss section, or instrument panel. The in-cabin camera 95, for example, images the vehicle occupant periodically and repeatedly.

Prior to explaining the vehicle control system 100, explanation follows regarding the traction drive force output device 200, the steering device 210, and the brake device 220.

The traction drive force output device 200 outputs traction drive force (torque) for causing the vehicle to travel to drive wheels. In cases in which the vehicle M is an automobile that has an internal combustion engine as the power source, the traction drive force output device 200 includes, for example, an engine, a transmission, and an engine electronic control unit (ECU) that controls the engine. In cases in which the vehicle M is an electric automobile that has an electric motor as the power source, the traction drive force output device 200 includes, for example, a traction motor and a motor ECU that controls the traction motor. In cases in which the vehicle M is a hybrid automobile, the traction drive force output device 200 includes, for example, an engine, a transmission, and an engine ECU; and a traction motor and a motor ECU. In cases in which the traction drive force output device 200 includes only an engine, the engine ECU adjusts the engine throttle opening, the shift level, or the like, in accordance with information input from a traction controller 160, described later. In cases in which the traction drive force output device 200 includes only a traction motor, the motor ECU adjusts a duty ratio of a PWM signal applied to the traction motor, in accordance with information input from the traction controller 160. In cases in which the traction drive force output device 200 includes an engine and a traction motor, the engine ECU and the motor ECU cooperatively control traction drive force, in accordance with information input from the traction controller 160.

The steering device 210 includes, for example, a steering ECU and an electric motor. The electric motor, for example, exerts force in a rack-and-pinion mechanism to change the orientation of the steering wheel. The steering ECU drives the electric motor in accordance with information input from the vehicle control system 100, or input information regarding the steering angle or steering torque, and changes the orientation of the steering wheel.

The brake device 220 is, for example, an electric servo brake device including a brake caliper, a cylinder that transmits hydraulic pressure to the brake caliper, an electric motor that causes the cylinder to generate hydraulic pressure, and a brake controller. The brake controller of the electric servo brake device controls an electric motor in accordance with information input from the traction controller 160, such that braking torque is output to each wheel in accordance with the braking operation. The electric servo brake device may include a mechanism that transmits hydraulic pressure generated due to operation of the brake pedal to the cylinder via a master cylinder as a backup. Note that the brake device 220 is not limited to the electric servo brake device explained above and may be an electronically controlled hydraulic brake device. The electronically controlled hydraulic brake device controls an actuator in accordance with information input from the traction controller 160 and transmits hydraulic pressure of a master cylinder to the cylinder. The brake device 220 may also include a regenerative brake that uses a traction motor which might be included in the traction drive force output device 200.

Vehicle Control System

Explanation follows regarding the vehicle control, system 100. The vehicle control system 100 is, for example, implemented by one or more processors, or by hardware having equivalent functionality such as circuitry. The vehicle control system 100 may be configured by a combination of a processor such as a central processing unit (CPU), a storage device, and an ECU (electronic control unit) in which a communication interface is connected by an internal bus, or a micro-processing unit (MPU) or the like.

Returning to FIG. 2, the vehicle control system 100 includes, for example, the target lane determination section 110, an automated driving controller 120, the traction controller 160, and the storage section 180. The automated driving controller 120 includes, for example, an automated driving mode controller 130, a vehicle position recognition section 140, an environment recognition section 142, an action plan generation section 144, a course generation section 146, and a switch controller 150. Some or all out of the target lane determination section 110, the respective sections of the automated driving controller 120, and the traction controller 160 are implemented by the processor executing a program (software). Moreover, of these, some or all may be implemented by hardware such as a large scale integration (LSI) or an application specific integrated circuit (ASIC), or may be implemented by a combination of software and hardware.

The storage section 180 stores information such as high precision map information 182, target lane information 184, action plan information 186, and mode-specific operation permission information 188. The storage section 180 is implemented by read only memory (ROM) or random access memory (RAM), a hard disk drive (HDD), flash memory, or the like. The program executed by the processor may be pre-stored in the storage section 180, or may be downloaded from an external device via an onboard internet setup or the like. Moreover, the program may be installed in the storage section 180 by loading a portable storage medium storing the program into a drive device, not illustrated in the drawings. Moreover, the vehicle control system 100 may be configured distributed across plural computer devices (on-board computers).

The target lane determination section 110 is, for example, implemented by an MPU. The target lane determination section 110 divides the route provided from the navigation device 50 into plural blocks (for example, divides the route every 100 m along the direction of progress of the vehicle), and references the high precision map information 182 to determine the target lane for each block. The target lane determination section 110, for example, determines which lane number from the left to travel in. In cases in which a junction point, a merge point, or the like is present in the route, the target lane determination section 110, for example, determines the target lanes so as to enable the vehicle M to travel along a sensible travel route for advancing beyond the junction. The target lanes determined by the target lane determination section 110 are stored in the storage section 180 as the target lane information 184.

The high precision map information 182 is map information with higher precision than the navigation map of the navigation device 50. The high precision map information 182 includes, for example, lane-center information, lane-boundary information, or the like. The high precision map information 182 may also include, for example, road information, traffic restriction information, address information (address, postal code), facilities information, phone number information, and the like. The road information includes information such as information indicating whether the type of road is an urban road, a toll road (including expressways), a national highway, or a prefectural road; the number of lanes in the road; the width of each lane; the gradient of the road; the position of the road (three dimensional coordinates including a longitude, a latitude, and an altitude); the curvature of the lanes; the position of lane merge and junction points; and signage provided on the road. The traffic restriction information includes information regarding lane closures due to road work, traffic accidents, congestion, and the like.

The automated driving mode controller 130 determines the automated driving mode to be implemented by the automated driving controller 120. The automated driving mode in the present embodiment includes the following modes. Note that the following modes are merely examples, and the number of modes of the automated driving may be freely determined.

Mode A

Mode A is the mode in which the level of automated driving is highest. In cases in which Mode A is being implemented, all vehicle controls, such as complex merging control, are performed automatically, such that a vehicle occupant does not need to monitor: the surroundings or state of the vehicle M.

Mode B

Mode B is the mode having the next highest level of automated driving after Mode A. Although in principle all vehicle control is performed automatically in cases in which Mode B is implemented, the driving operation of the vehicle M may be entrusted to the vehicle occupant depending on the situation. The vehicle occupant therefore needs to monitor the surroundings and state of the vehicle M.

Mode C

Mode C is the mode having the next highest level of automated driving after Mode B. In cases in which Mode C is implemented, the vehicle occupant needs to perform confirmation operations on the HMI 70 depending on the situation. In Mode C, for example, the vehicle occupant is informed of the timing for a lane change, and the lane change is made automatically in cases in which the vehicle occupant has performed an operation on the HMI 70 instructing the lane change. The vehicle occupant therefore needs to monitor the surroundings and state of the vehicle M.

The automated driving mode controller 130 determines the automated driving mode based on operation on the HMI 70 by the vehicle occupant, events determined by the action plan generation section 144, traveling states determined by the course generation section 146, and the like. The automated driving mode is informed to the HMI controller 170. Moreover, a limit that depends on the performance of the detection devices DD of the vehicle M or the like may be set on the automated driving mode. For example, configuration may be such that the Mode A is not implemented in cases in which the performance of the detection devices DD is low. Whichever the mode, switching to the manual driving mode (override) is possible by an operation on the driving operation system configuration of the HMI 70.

The vehicle position recognition section 140 of the automated driving controller 120 recognizes the lane in which the vehicle M is traveling (the travel lane) and the position of the vehicle M relative to the travel lane, based on the high precision map information 182 stored in the storage section 180, and the information input from the finders 20, the radars 30, the camera 40, the navigation device 50, or the vehicle sensors 60.

The vehicle position recognition section 140, for example, recognizes the travel lane by comparing a pattern of road demarcation lines (for example, an array of solid lines and dashed lines) recognized in the high precision map information 182 against a road demarcation line pattern of the surroundings of the vehicle M recognized in the images imaged using the camera 40. In the recognition, the position of the vehicle M acquired from the navigation device 50 or the processing result by the INS may be taken into account.

Figure 4:
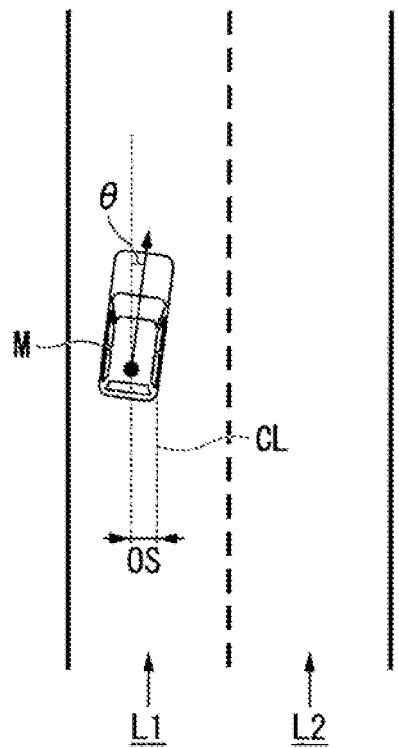
FIG. 4 is a diagram illustrating a state in which the position of a vehicle relative to a travel lane is recognized by a vehicle position recognition section.

FIG. 4 is a diagram illustrating a state in which the relative position of the vehicle M with respect to a travel lane L1 is recognized by the vehicle position recognition section 140. As the relative position of the vehicle M with respect to the travel, lane L1, the vehicle position recognition section 140 recognizes an offset OS between a reference; point (for example, the center of mass) of the vehicle M and a travel lane center CL, and an angle θ formed between the direction of progress of the vehicle M and a line aligned with the travel lane center CL. Note that, alternatively, the vehicle position recognition section 140 may recognize the position of the reference point of the vehicle M or the like with respect to either of the side end portions of the lane L1 itself as the relative position of the vehicle M with respect to the travel lane. The relative position of the vehicle M recognized by the vehicle position recognition section 140 is provided to the target lane determination section 110.

The environment recognition section 142 recognizes the position, speed, and acceleration states of nearby vehicles based on the information input from the finders 20, the radars 30, the camera 40, and the like. Nearby vehicles are, for example, vehicles that are traveling in the surroundings of the vehicle M and that are traveling in the same direction as the vehicle M. The positions of the nearby vehicles may be presented as representative points such as centers of mass or corners of other vehicles, or may be represented as regions expressed by the outlines of the other vehicles. The "state" of a nearby vehicle may include whether or not the nearby vehicle is accelerating or changing lanes (or whether or not the nearby vehicle is attempting to change lanes), as ascertained, based on the information of the various apparatuses described above. The environment recognition section 142 may also recognize the position of a guard rail, a utility pole, a parked vehicle, a pedestrian, a person riding a bicycle or the like, and other objects in addition to the nearby vehicles.

The action plan generation section 144 sets a starting point of automated driving and/or a destination of automated driving. The starting point of automated driving may be the current position of the vehicle M, or may be a point set by operation to instruct automated driving. The action plan generation section 144 generates an action plan in the segments between the starting point and the destination of automated driving. Note that there is no limitation thereto, and the action plan generation section 144 may generate an action plan for freely selected segments.

Figure 5:
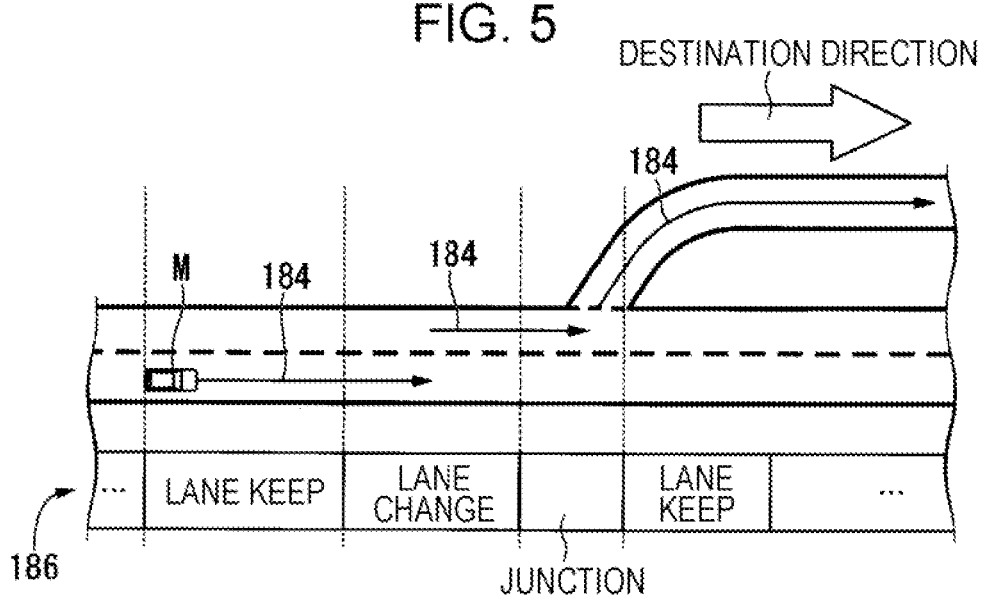
FIG. 5 is a diagram illustrating an example of an action plan generated for a given segment.

The action plan is, for example, composed of plural events to be sequentially executed. The events include, for example: a deceleration event that causes the vehicle M to decelerate, an acceleration event that causes the vehicle M to accelerate, a lane-keep event that causes the vehicle M to travel without departing from the travel lane, a lane-change; event that causes the travel lane to change, an overtake; event that causes the vehicle M to overtake the vehicle in front, a junction event that causes a lane change to the desired lane at a junction point or causes the vehicle M to travel so as not to depart from the current travel lane, a merge event that causes the vehicle M to accelerate or decelerate in a merging lane for merging with a main lane and changes the travel lane, and a handover event that causes a transition from the manual driving mode to the automated driving mode at a starting point of automated driving or causes a transition from the automated driving mode to the manual driving mode at a point where automated driving is expected to end. The action plan generation section 144 sets a lane-change event, a junction event, or a merge event at places where the target lane determined by the target lane determination section 110 switches. Information indicating the action plan generated by the action plan generation section 144 is stored in the storage section 180 as the action plan information 186, FIG. 5 is a diagram illustrating an example of the action plan generated for a given segment. As illustrated in this figure, the action plan generation section 144 generates the action plan needed for the vehicle M to travel in the target lane indicated by the target lane information 184. Note that the action plan generation section 144 may dynamically change the action plan irrespective of the target lane information 184, in accordance with changes to the conditions of the vehicle M. For example, in cases in which the speed of a nearby vehicle recognized by the environment recognition section 142 during vehicle travel exceeds a threshold value, or the movement direction of a nearby vehicle traveling in a lane adjacent to the vehicle-itself lane is toward the vehicle-itself lane direction, the action plan generation section 144 changes an event set in the driving segments that the vehicle M was expected to travel. For example, in cases in which events have been set such that a lane-change event is to be executed after a lane-keep event, when, during the lane-keep event, the recognition result of the environment recognition section 142 has determined that a vehicle is approaching from the rear in the lane change target lane at a speed at or above a threshold value, the action plan generation section 144 may change the event following the lane-keep event from a lane-change event to a deceleration event, a lane-keep event, or the like. As a result, the vehicle control system 100 can cause the vehicle M to autonomously travel safely even in cases in which a change occurs to the state of the environment.

Figure 6:
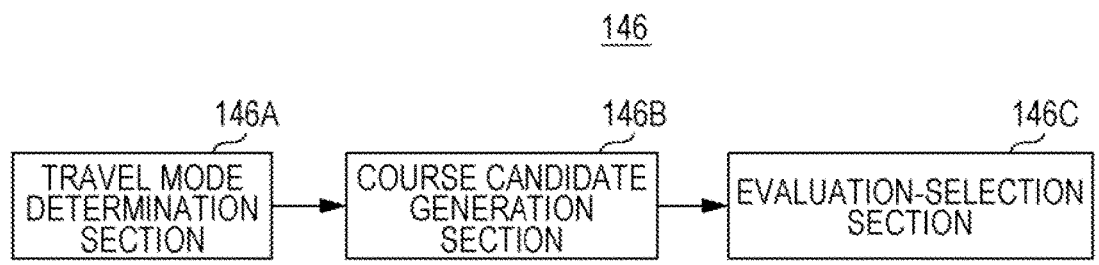
FIG. 6 is a diagram illustrating an example of a configuration of a course generation section.

FIG. 6 is a diagram illustrating an example of the configuration of the course generation section 146. The course generation, section 146 includes, for example, a travel mode determination section 146A, a course candidate generation section 146B, and an evaluation-selection section 146C.

When implementing a lane-keep event, the travel mode determination section 146A, for example, determines a travel mode from out of constant, speed travel, following-travel, low speed following-travel, decelerating travel, curve travel, obstacle avoidance travel, or the like. In such cases, the travel mode determination section 146A determines that the travel mode is constant speed travel when no other vehicles are present ahead of the vehicle M. The travel mode determination section 146A determines that the travel mode is following-travel in cases such as when a vehicle in front is to be followed. The travel mode determination section 146A determines that, the travel mode is low speed following-travel in a congested situation or the like. The travel mode determination section 146A determines that the travel mode is decelerating travel in cases in which deceleration of a vehicle in front has been recognized by the environment recognition section 142, and in cases in which an event for, for example, stopping or parking is implemented. The travel mode determination section 146A determines that the travel mode is curve travel in cases in which the environment recognition section 142 has recognized that the vehicle M is approaching a curve in the road. The travel mode determination section 146A determines that the travel mode is obstacle avoidance travel in cases in which the environment recognition section 142 has recognized an obstacle in front of the vehicle M. Moreover, when carrying out lane-change events, overtake events, junction events, merge events, handover events, or the like, the travel mode determination section 146A determines the travel mode in accordance with each event.

Figure 7:
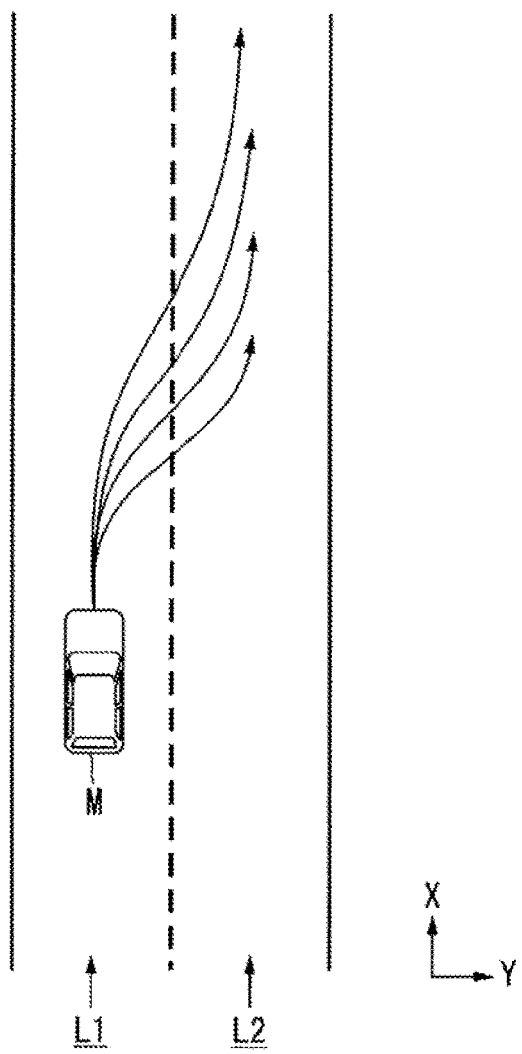
FIG. 7 is a diagram illustrating example candidates for a course generated by a course candidate generation section.

The course candidate generation section 146B generates candidates for a course based on the travel mode determined by the travel mode determination section 146A. FIG. 7 is a diagram illustrating example candidates for a course generated by the course candidate generation section 146B. FIG. 7 illustrates candidates for a course generated when the vehicle M changes lanes from a lane L1 to a lane L2.

Figure 8:
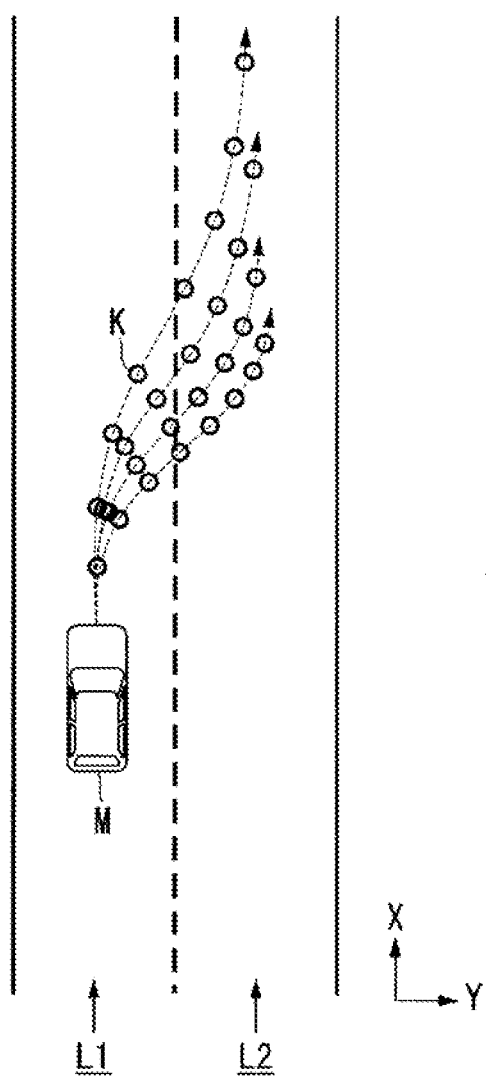
FIG. 8 is a diagram in which candidates for a course generated by a course candidate generation section are represented by course points.

Courses such as illustrated in FIG. 7, for example, are determined by the course candidate generation section 146B as collections of target positions (course points K) where the reference position (for example, the center of mass or rear wheel axle center) of the vehicle M is to arrive at specific times in the future. FIG. 8 is a diagram illustrating candidates for a course generated by the course candidate generation section 146B, represented by course points K. The wider the separation between course points K, the faster the speed of the vehicle M, and the narrower the separation between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel mode determined by the travel mode determination section 146A.

Figure 9:
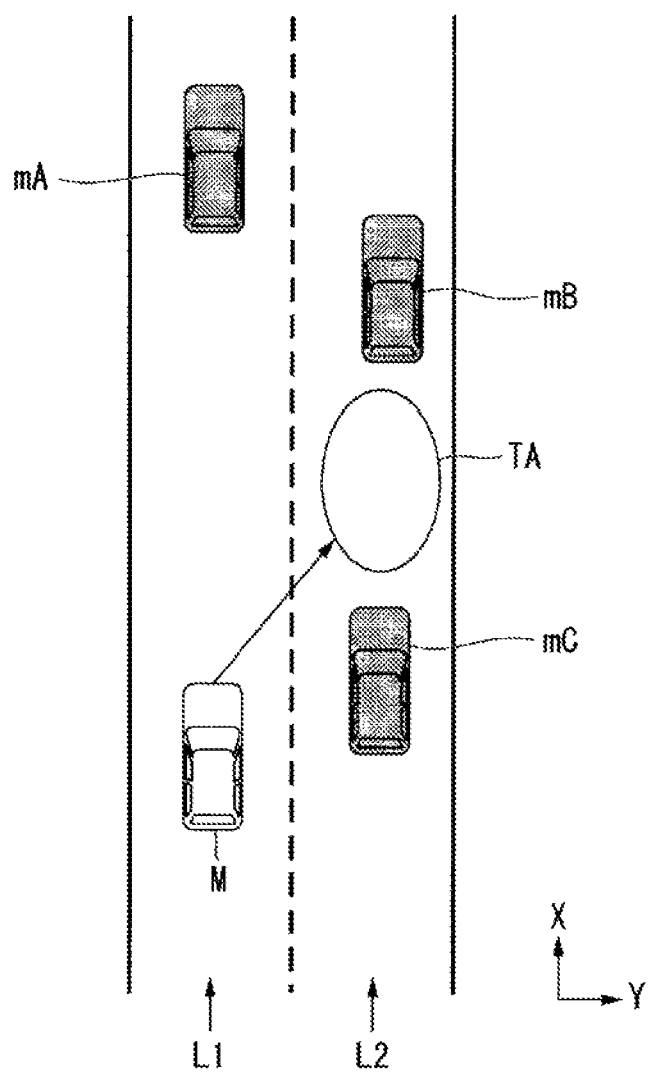
FIG. 9 is a diagram illustrating a lane change target position.

Explanation follows regarding a determination method for the target speed for performing a lane change (including at junctions). The course candidate generation section 146B first sets a lane change target position (or a merge target position). The lane change target position is set as a position relative to nearby vehicles, and determines "between which nearby vehicles to change lanes". The course candidate generation section 146B observes three nearby vehicles as references for the lane change target position, and determines a target speed for performing the lane change. FIG. 9 is a diagram illustrating a lane change target position TA. In this figure, L1 represents the lane of the vehicle, and L2 represents an adjacent lane. Here, a vehicle in front mA is defined as a nearby vehicle traveling directly in front of the vehicle M in the same lane as the vehicle M, a forward reference vehicle mB is defined as a nearby vehicle traveling directly in front of the lane change target position TA, and a rear reference vehicle mC is defined as a nearby vehicle traveling directly behind the lane change target position TA. The vehicle M needs to accelerate or decelerate to move to beside the lane change target position TA, but must avoid tailgating the vehicle in front mA at this time. The course candidate generation section 146B therefore predicts the future state of the three nearby vehicles and determines a target speed that will not interfere with any of the nearby vehicles.

Figures 10, 11:
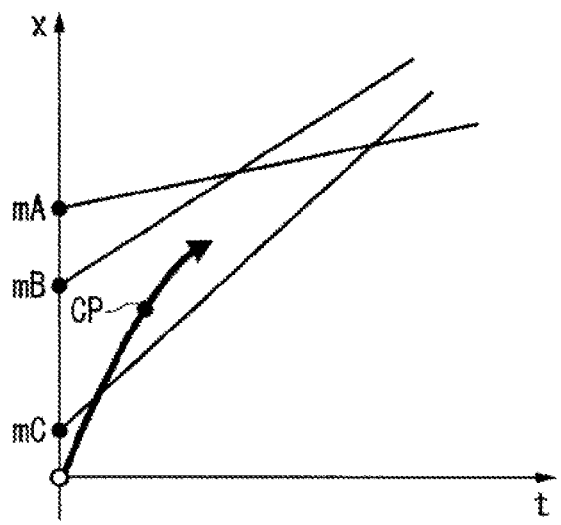
FIG. 10 is a diagram illustrating a speed generation model in a case in which the speeds of three nearby vehicles are assumed to be constant.
FIG. 11 is a table illustrating an example of mode-specific operation permission information.

FIG. 10 is a diagram illustrating a speed generation model when the speed of the three nearby vehicles is assumed to be constant. In this figure, the straight lines extending from mA, mB, and mC each represent a displacement in the direction of progress when the nearby vehicles are assumed to be traveling at respective constant speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target speeds are applied to a model such as a spline curve to derive plural candidates for the course as illustrated in FIG. 8. Note that the movement pattern of the three nearby vehicles is not limited to that of constant speeds such as illustrated in FIG. 10, and may be predicted under the assumption of constant acceleration or constant jerk.

The evaluation-selection section 146C, evaluates, for example, the candidates for the course generated by the course candidate generation section 146B from the two viewpoints of plan achievability and safety, and selects a course to be output to the traction controller 160. From the viewpoint of plan achievability, a course is evaluated highly in cases in which, for example, the course closely follows a previously generated plan (for example, an action plan) and the total length of the course is short. For example, in cases in which a lane change to the right is desired, a course that temporarily changes lanes to the left and then returns is given a lower evaluation. From the viewpoint of safety, for example, the further the distance between the vehicle M and an object (such as a nearby vehicle) and the smaller the amount of change in acceleration/deceleration, steering angle, or the like at each course point, the higher the evaluation.

The switch controller 150 switches between the automated driving mode and the manual driving mode based on a signal input from the automated driving changeover switch 87. The switch controller 150 also switches from the automated driving mode to the manual driving mode based on an operation on the configuration of the driving operation system of the HMI 70 instructing acceleration, deceleration, or steering. For example, the switch controller 150 switches from the automated driving mode to the manual driving mode (overrides) when a state in which an operation amount indicated by the signal input from the configuration of the driving operation system of the HMI 70 exceeds a threshold value has continued for a reference duration or longer. Note that after switching to the manual driving mode due to override, the switch controller 150 may return to the automated driving mode in cases in which operation on the configuration of the driving operation system of the HMI 70 has not been detected for a specific amount of time.

The traction controller 160 controls the traction drive force output device 200, the steering device 210, and the brake device 220 such that the vehicle M passes through the course generated by the course generation section 146 at expected timings.

When informed of information relating to the automated driving mode by the automated driving controller 120, the HMI controller 170 references the mode-specific operation permission information 183, and controls the HMI 70 according to the classification of the automated driving mode.

FIG. 11 is a table illustrating an example of the mode-specific operation permission information 188. The mode-specific operation permission information 188 illustrated in FIG. 11 includes "manual driving mode" and "automated driving mode" as driving mode items. The mode-specific operation permission information 188 includes "Mode A", "Mode B", "Mode C", and the like described above under "automated driving mode". The mode-specific operation permission information 188 also includes "navigation operation", which is an operation on the navigation device 50, "content playback operation", which is an operation on the content playback device 85, "instrument panel operation", which is an operation on the in-cabin display 82A, and the like, as items of the non-driving operation system. In the example of the mode-specific operation permission information 188 illustrated in FIG. 11, permissions are set for operations by the vehicle occupant on the non-driving operation system for each of the driving modes described above; however, the relevant interface devices are not limited thereto.

The HMI controller 170 determines the devices for which usage is permitted (part or all of the navigation device 50 and the HMI 70) and the devices for which usage is not permitted by referencing, the mode-specific operation permission information 188 based on the mode information acquired from the automated driving controller 120. The HMI controller 170 also controls permissions for receiving operations on the HMI 70 or the navigation device 50 of the non-driving operation system from a vehicle occupant based on the determination result.

For example, when the driving mode executed by the vehicle control system 100 is the manual driving mode, a vehicle occupant operates the driving operation system of the HMI 70 (for example, the accelerator pedal 71, the brake pedal 74, the shift lever device 76, the steering wheel 78, and the like). When the driving mode executed by the vehicle control system 100 is an automated driving mode such as Mode B or Mode C, the vehicle occupant has a responsibility to monitor the surroundings of the vehicle M. In such a case, in order to prevent activities (driver distractions) other than driving (for example, operating the HMI 70) from distracting the attention of the vehicle occupant, the HMI controller 170 performs control such that part or all of the non-driving operation system of the HMI 70 does not accept operations. At such times, in order to promote monitoring of the surroundings of the vehicle M, the HMI controller 170 may cause the presence of vehicles nearby the vehicle M that have been recognized by the environment recognition, section 142 and the state of these nearby vehicles to be displayed on the display device 82 using images or the like, and the HMI controller 170 may prompt confirmation operations by a driver to be received by the HMI 70 in accordance with the situation the vehicle M is traveling in.

When the driving mode is Mode A of the automated driving modes, the HMI controller 170 relaxes driver distraction restrictions and performs control such that non-driving operation system that was not receiving operations can receive operations from the vehicle occupant. For example, the HMI controller 170 displays an image on the display device 82, outputs audio through the speaker 83, or plays back content, from a DVD or the like on the content, playback device 85. Note that in addition to content stored on a DVD or the like, the content played back by the content playback device 85 may include, for example, various content related to leisure and entertainment, such as television programming. The "content, playback operation" illustrated in FIG. 11 may also mean a content operation related to such leisure and entertainment.

Figure 12:
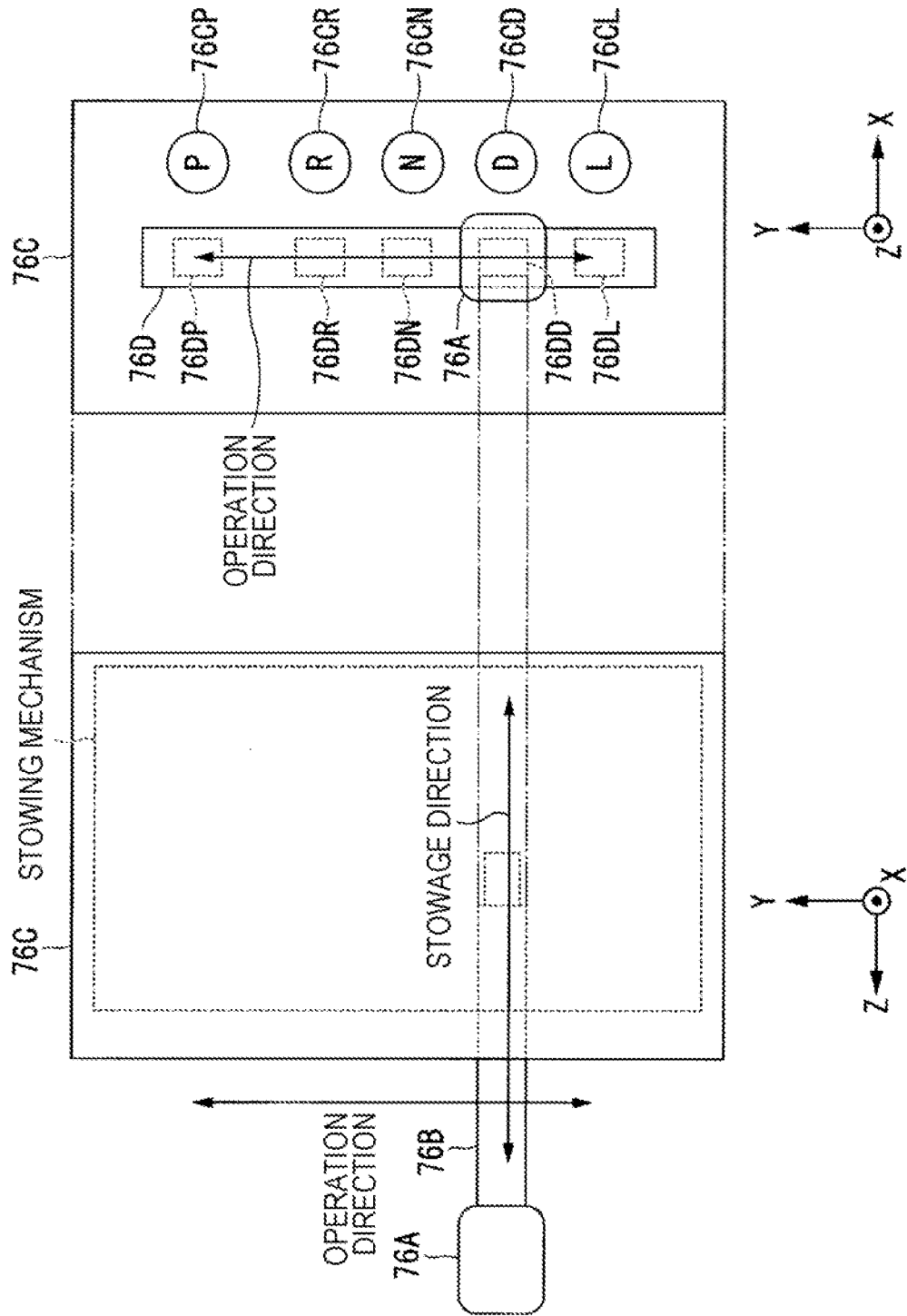
FIGS. 12A and 12B are diagrams illustrating an example of a shift lever device.

Detailed explanation follows regarding an example of the shift lever device 76 in the embodiment described above. FIGS. 12A and 12B are a side view and a top-down view illustrating an example; of the shift lever device 76.

As illustrated in FIG. 12A, the shift lever device 76 includes, for example, a head 76A, a shift lever 76B, and a cover member 76C. As illustrated in FIG. 12B, a L range label portion 76CL, a D range label portion 76CD, a N range label portion 76CN, a R range label portion 76CR, and a P range label portion 76CP, indicating respective shift positions, are printed on an upper face of the cover member 76C. An opening 76D is formed in the upper face of the cover member 76C. The shift lever 76B is inserted into the opening 76D. An operation position of the shift lever 76B is changed along an operation direction (the Y direction).

The operation positions are provided in correspondence with transmission states of the vehicle M. The operation positions may include a L range operation position 76DL serving as a driving position, a D range operation position 76DD serving as a driving position, a N range operation position 76DN serving as a neutral position, a R range operation position 76DR serving as a reverse position, and a P range operation position 76DP serving as a park position; however, there is no limitation thereto. The operation positions may be a D range, a N range, a R range, and a P range.

Figure 13:
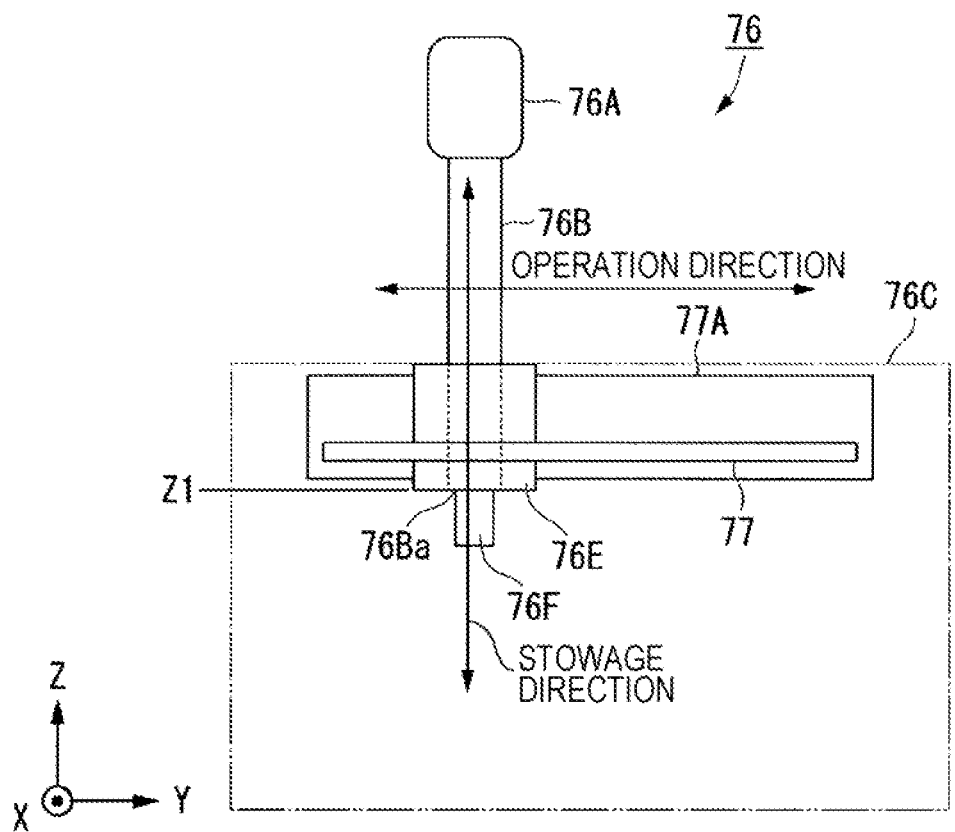
FIG. 13 is a side view illustrating a state in which a shift lever is at an operation position.
Figure 14:
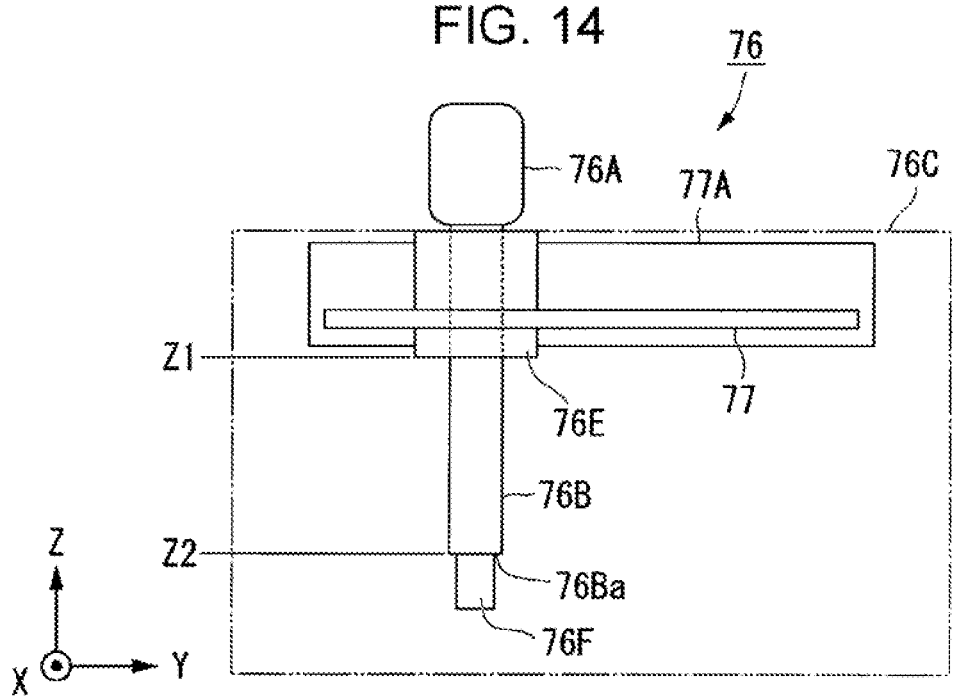
FIG. 14 is a side view illustrating a state in which a shift lever is at a stowed position.

FIG. 13 is a side view illustrating a state in which the shift lever 76B is at an operation position Z1. FIG. 14 is a side view illustrating a state in which the shift lever 76B is at a stowed position 22. The shift position sensor 77 is provided on a slide mechanism 77A. The slide mechanism 77A includes a rail or the like that allows the shift lever 76B to move along the operation direction while supporting the shift lever 76B. In cases in which a specific operation force or greater is applied to the shift lever 76B along the operation direction, the slide mechanism 11A allows the head 76A and the shift lever 76B to move along the operation direction. The shift position sensor 77 outputs the position of the shift lever 76B that has been slid using the slide mechanism 77A to the HMI controller 170 as a shift position signal. The shift position sensor 77 also outputs the shift position signal to a shift drive actuator (drive section) 200a. The shift drive actuator 200a transmits an operation to switch to the shift position received using the shift lever 76B to a transmission in the traction drive force output device 200.

A stowing mechanism 76E is attached to the shift lever 76B. The stowing mechanism 76E is an example of a shielding mechanism that shields at least a portion of an operation section (the head 76A and the shift lever 76B) from sight. The stowing mechanism 76E includes, for example, a rack-and-pinion mechanism (not illustrated in the drawings). A rack with teeth formed along a scanning direction is attached to a side face of the shift lever device 76, and a drive motor (see FIG. 15) drives a circular gear (pinion) that meshes with, the rack. The rotation direction of the drive motor is controlled in a first direction such that the stowing mechanism 76E moves the head 76A and the shift lever 76B in the −Z direction. The stowing mechanism 76E thereby pulls the shift lever 76B along a stowage direction (in the −Z direction) into the cover member 76C to stow the shift lever 76B. In a state in which the shift lever 76B has been stowed, a bottom face 76Ba of the shift lever 76B is moved from the operation position Z1 to the stowed position Z2. The operation position Z1 is a position at which the shift position of the shift lever device 76 is able to be manipulated. The rotation direction of the motor is controlled in a second direction such that the stowing mechanism 76E moves the head 76A and the shift lever 76B in the +Z direction. The stowing mechanism 76E thereby pushes out the shift lever 76B along the stowage direction (in the +Z direction) from inside the cover member 76C to expose the shift lever 76B from the cover member 76C.

A pressure sensor 76F is attached to the bottom face 76Ba of the shift lever 76B. The pressure sensor 76F detects a pressing operation on the shift lever 76B by a vehicle occupant. The pressing operation on the shift lever 76B is an example of an operation: to shield the shift lever 76B. A pressure signal detected by the pressure sensor 76F is supplied to the HMI controller 170.

Figure 15:
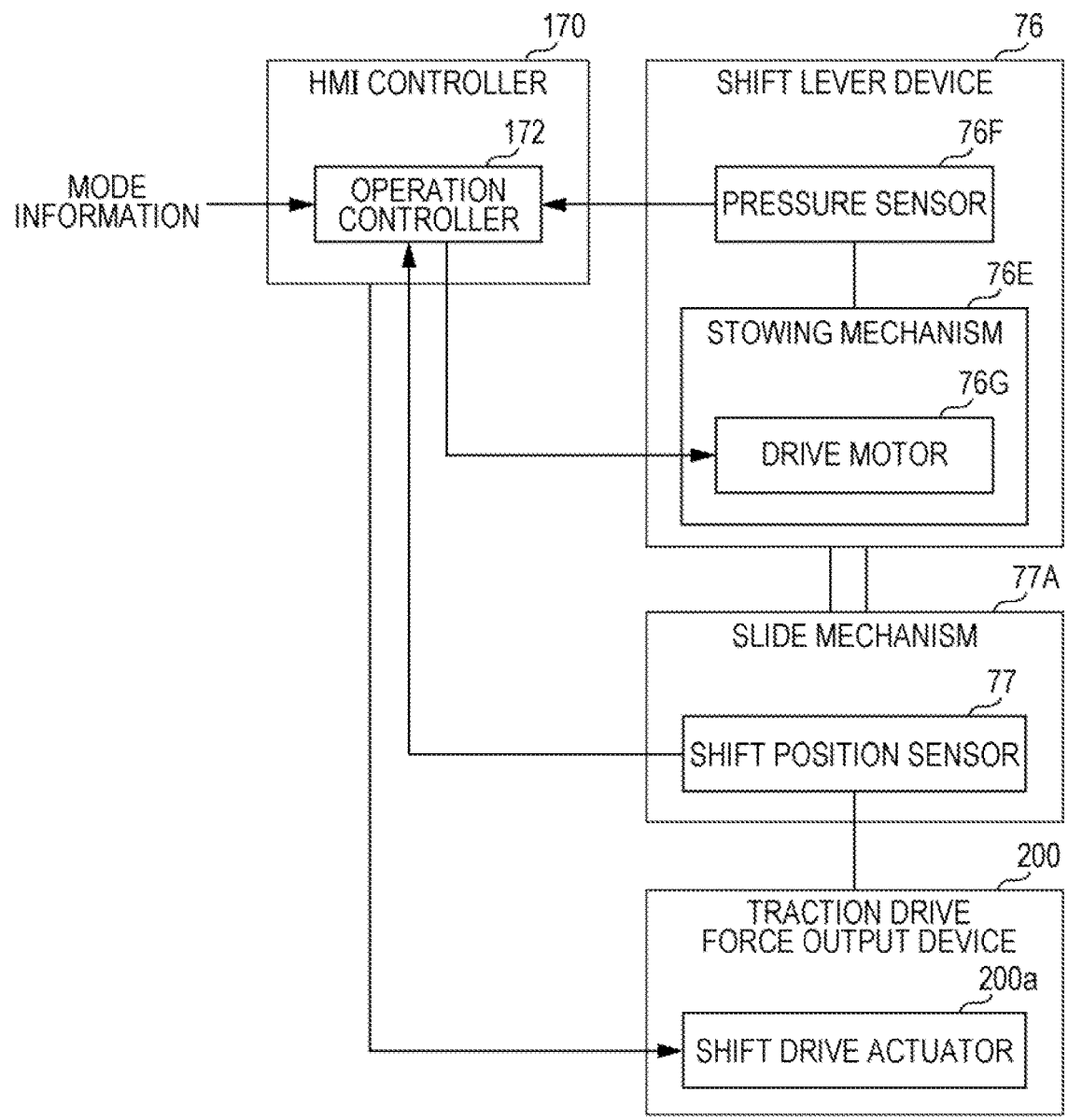
FIG. 15 is a diagram illustrating an example of a relationship between a shift lever device, a slide mechanism, and a HMI controller.

FIG. 15 is a diagram illustrating an example of a relationship between the shift lever device 76, the slide mechanism 77A, and the HMI controller 170. The shift lever device 76 includes, for example, the pressure sensor 76F and a drive motor 76G. The HMI controller 170 includes an operation controller 172. The operation controller 172 is supplied with the pressure signal from the pressure sensor 76F and the shift position signal from the shift position sensor 77. The operation controller 172 limits reception, by the shift lever 76B, of an operation to switch a shift position while automated driving is being executed by the automated driving controller 120.

The operation controller 172 prohibits action of the shift drive actuator 200a in cases in which an operation has been received by the shift lever 76B while automated driving is being executed by the automated driving controller 120. Namely, the operation controller 172 supplies a control signal to the shift drive actuator 200a such that the shift drive actuator 200a is not driven even if input with a shift position signal. The operation controller 172 also prohibits detection of an operation by the shift position sensor 77 to switch a shift position while automated driving is being executed by the automated driving controller 120.

The operation controller 172 may cause the drive motor 76G of the stowing mechanism 76E to operate while automated driving is being executed by the automated driving controller 120. The operation controller 172 thereby stows at least a portion of the shift lever 76B in the cover member 76C to shield at least a portion of the shift lever 76B.

Figure 16:
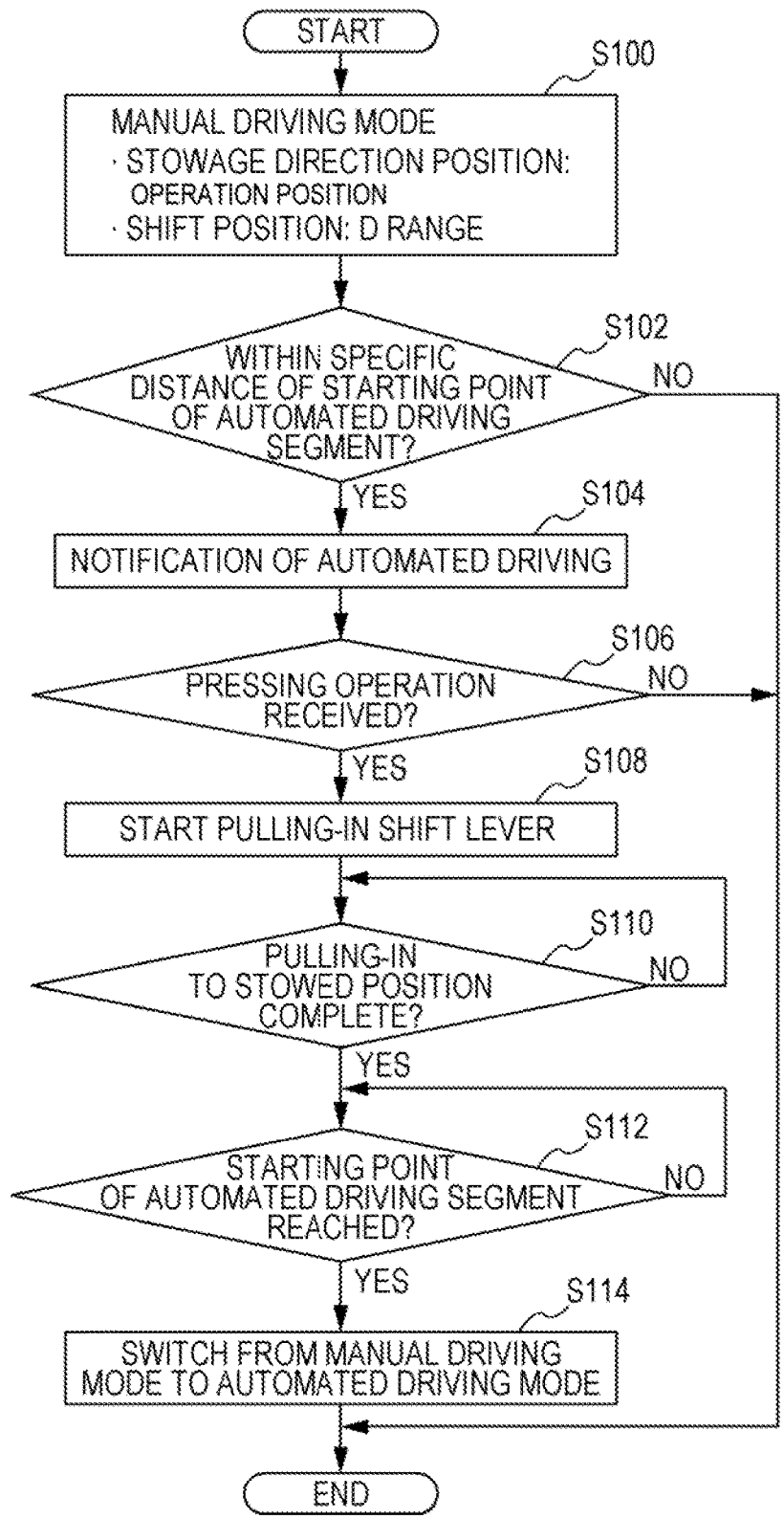
FIG. 16 is a flowchart illustrating a flow of shift lever pull-in processing.

Explanation follows regarding an action to pull the shift lever 76B into the cover member 76C when switching the driving mode of the vehicle M from the manual driving mode to the automated driving mode. FIG. 16 is a flowchart illustrating a flow of shift lever 76B pull-in processing. The processing of FIG. 16 is repeatedly executed while the vehicle M is traveling in the manual driving mode.

First, in a state in which the stowage direction position of the shift lever 76B is at the operation position Z1 in the manual driving mode and the shift position is at the B range (driving position) (step S100), the operation controller 172 determines whether or not a distance from the position of the vehicle M to a starting point of an automated driving segment is within a specific distance (step S102). When the distance from the position of the vehicle M to the starting point of an automated driving segment is within the specific distance, the operation controller 172 performs a notification that automated driving will start. The operation controller 172, for example, causes a message image saying "Starting automated driving in XX meters" to be displayed on the display device 82. The operation controller 172 may also perform notification prompting an operation to press the shift lever 76B into the cover member 76C. The operation controller 172, for example, causes a message image saying "To permit the start of automated driving, please press the shift lever downward" to be displayed on the display device 82, or outputs an audio message from the speaker 83.

Next, the operation controller 172 determines whether a pressure indicated by a pressure signal supplied from the pressure sensor 76F is a specific value or greater to determine whether or not a pressing operation on the shift lever 76B has been received (step S106). In cases in which a pressing operation on the shift lever 76B has been received, the operation controller 172 starts pulling in the shift lever 76B (step S108). Note that in cases in which the distance from the position of the vehicle M to the starting point of the automated driving segment is not within the specific distance (step S102), and in cases in which a pressing operation on the shift lever 76B has not been received (step S106), the operation controller 172 ends the processing of the flowchart.

Next, the operation controller 172 determines, whether or not the pulling-in of the shift lever 76B to the stowed position Z2 has been completed (step S110). The operation controller 172, for example, determines that the pulling-in of the shift lever 76B to the stowed position Z2 has been completed when the drive motor 76G has rotated a specific amount. The operation controller 172 may also determine that the pulling-in of the shift lever 76B to the stowed position Z2 has been completed when the speed of rotation of the drive motor 76G drops due to a lower portion of the head 76A contacting the cover member 76C. Note that the operation controller 172 repeats the determination of step S110 in cases in which the pulling-in of the shift lever 76B to the stowed position Z2 has not been completed.

Next, in cases in which it has been determined that the pulling-in of the shift lever 76B to the stowed position Z2 has been completed, the operation controller 172 determines whether or not the starting point of the automated driving segment has been reached (step S112). Note that the operation controller 172 repeats the determination of step S112 in cases in which the starting point of the automated driving segment has not been reached.

In cases in which the starting point of the automated driving segment has been reached, the switch controller 150 switches the driving mode of the vehicle M from the manual driving mode to the automated driving mode (step S114).

Note that although the processing illustrated in FIG. 16 starts pulling in the shift lever 76B in cases in which a pressing operation on the shift lever 76B has been received, there is no limitation thereto. The operation controller 172 may automatically start pulling in the shift lever 76B when the distance to the starting point of an automated driving segment is within the specific distance. Further, although the processing illustrated in FIG. 16 may switch from the manual driving mode to the automated driving mode when the pulling of the shift lever 76B into the cover member 76C has been completed, there is no limitation thereto. The switch controller 150 may start the automated driving mode without waiting for the pulling of the shift lever 76B into the cover member 76C to be completed.

Figure 17:
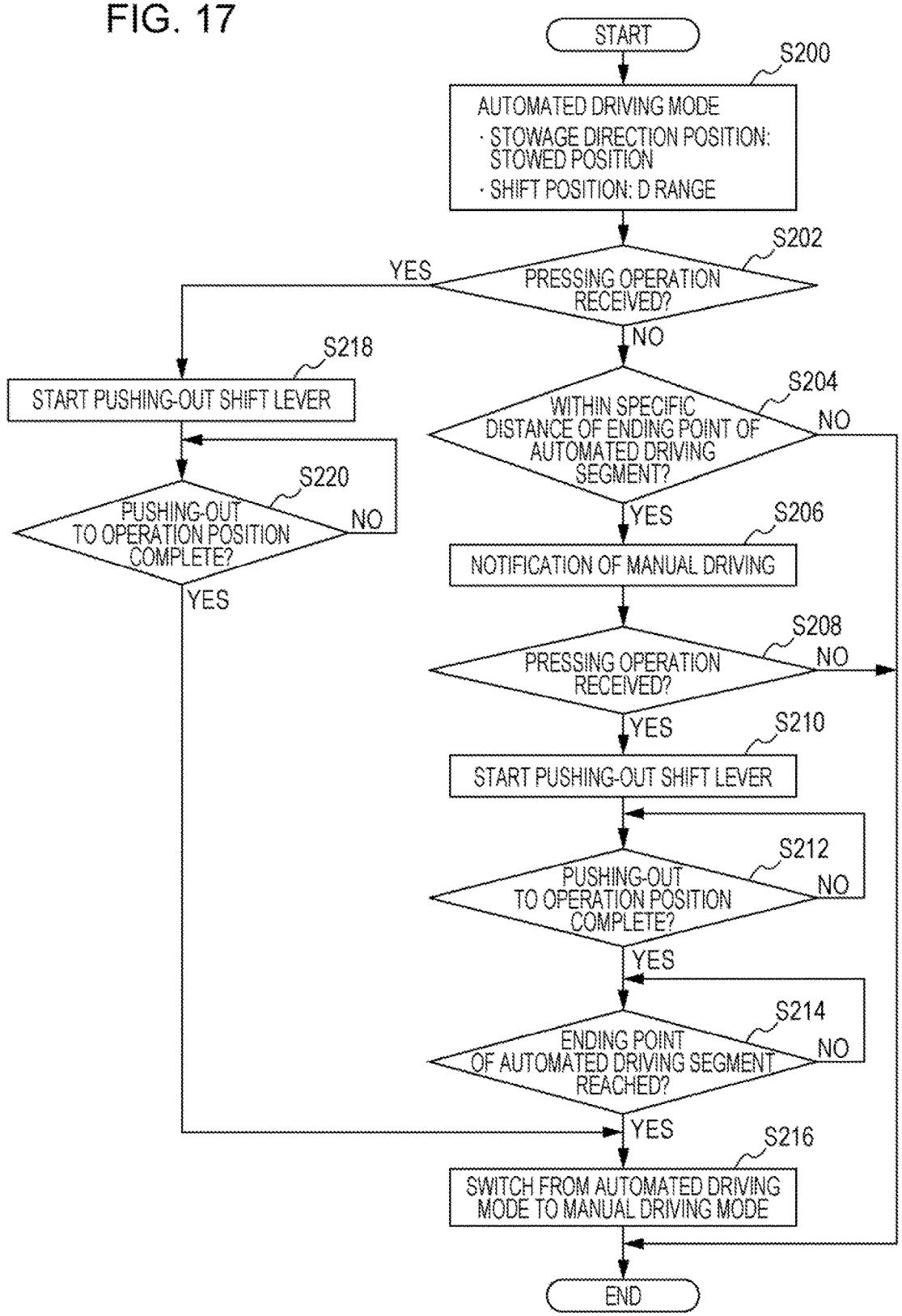
FIG. 17 is a flowchart illustrating a flow of shift lever push-out processing.

Explanation follows regarding an action to push out the shift lever 76B from inside the cover member 76C when switching the driving mode of the vehicle M from the automated driving mode to the manual driving mode. FIG. 17 is a flowchart illustrating a flow of shift lever 76B push-out processing. The processing of FIG. 17 is repeatedly executed while the vehicle M is traveling in the automated driving mode.

First, in a state in which the stowage direction position of the shift lever 76B is at the stowed position Z2 in the automated driving mode and the shift position is at the D range (driving position) (step S200), the operation controller 172 determines whether or not a pressing operation on the shift lever 76B has been received (step S202). In cases in which a pressing operation on the shift lever 76B has been received, the operation controller 172 starts an action to push the shift lever 76B out to the operation position Z1 (step S218). Next, the operation controller 172 determines whether or not the pushing-out of the shift lever 76B to the operation position Z1 has been completed (step S220). When the pushing-out of the shift lever 76B to the operation position Z1 has been completed, the operation controller 172 performs an override to switch the driving mode of the vehicle M from the automated driving mode to the manual driving mode (step S216).

In cases in which a pressing operation on the shift lever 76B has not been received, the operation controller 172 determines whether or not a distance from the position of the vehicle M to the ending point of an automated driving segment is within a specific distance (step S204). In cases in which the distance from the position of the vehicle M to the ending point of an automated driving segment is within the specific distance, the operation controller 172 perform a notification that manual driving will start. The operation controller 172, for example, causes a message image saying "Automated driving will end in XX Meters" to be displayed on the display device 82. The operation controller 172 may also perform notification prompting an operation to press the shift lever 76B into the cover member 76C. The operation controller 172, for example, causes a message image saying "To permit the end of automated driving, please press the shift lever downward" to be displayed on the display device 82.

Next, the operation controller 172 determines whether a pressure indicated by a pressure signal supplied from the pressure sensor 76F is a specific value or greater to determine whether or not a pressing operation on the shift lever 76B has been received (step S208). In cases in which a pressing operation on the shift lever 76B has been received, the operation controller 172 starts pushing out the shift lever 76B (step S210). Mote that in cases in which the distance from the position of the vehicle M to the ending point of an automated driving segment is not within the specific distance (step S204), and in cases in which a pressing operation on the shift lever 76B has not been received (step S208), the operation controller 172 ends the processing of the flowchart.

Next, the operation, controller 172 determines whether or not the pushing-out of the shift lever 76B to the operation position Z1 has been completed, (step S212). The operation controller 172 for example, determines that the pushing-out of the shift lever 76B to the operation position Z1 has been completed when the drive motor 76G has rotated a specific amount. Note that the operation controller 172 repeats the determination of step S212 in cases in which the pushing-out of the shift lever 76B to the operation position Z1 has not been completed.

Next, in cases in which it is determined that the pushing-out of the shift lever 76B to the operation position Z1 has been completed, the operation controller 172 determines whether or not the ending point of the automated driving segment has been reached (step S214). Note that the operation controller 172 repeats the determination of step S214 in cases in which the ending point of the automated driving segment has not been reached.

In cases in which the ending point of the automated driving segment has been reached, the switch controller 150 switches the driving mode of the vehicle M from the automated driving mode to the manual driving mode (step S216).

Note that although the processing illustrated in FIG. 17 starts pushing out the shift lever 76B in cases in which a pressing operation on the shift, lever 76B has been received, there is no limitation thereto. The operation controller 172 may automatically start pushing out the shift lever 76B when the distance to the ending point of an automated driving segment is within the specific distance. Further, although the processing illustrated in FIG. 17 may switch from the automated driving mode to the manual driving mode when the pushing-out of the shift lever 76B from inside the cover member 76C has been completed, there is no limitation thereto. The switch controller 150 may switch to the manual driving mode without waiting for the pushing-out of the shift, lever 76B from inside the cover member 76C to be completed.

As described above, in the vehicle control system 100 of the first embodiment, the stowing mechanism 76E is operated to pull the shift lever 76B into the cover member 76C, enabling reception, by the shift lever 76B, of an operation to switch a shift position while automated driving is executed to be limited. In the vehicle control system 100, mistaken operation of the shift lever device 76 by an occupant can thereby be suppressed. Moreover, the vehicle control system 100 of the first embodiment enables the obstruction of vehicle occupant activities by the shift lever 76B to be suppressed during the execution of automated driving.

Moreover, in the vehicle control system 100, in cases in which the shift position is in the D range serving as the driving position, the shift lever 76B is pulled in along an extension direction, and in cases in which the shift position is in the P range serving as the park position, the shift lever 76B is not pulled in along the extension direction. Accordingly, in the vehicle control system 100, in situations in which the shift lever device 76 is to be operated, such as when the vehicle M is stopped, pulling of the shift lever 76B into the cover member 76C can be prohibited.

Moreover, in the vehicle control system 100, when the vehicle M reaches a starting point of a segment where automated driving is to be executed, an action to pull in the shift lever 76B along the extension direction using the stowing mechanism 76E is started, enabling the shift lever 76B to be stowed in the cover member 76C prior to the vehicle M reaching the automated driving segment. In the vehicle control system 100, mistaken operation on the shift lever device 76 by an occupant can thereby be suppressed. The vehicle control system 100 also enables the obstruction of vehicle occupant activities by the shift lever 76B to be suppressed during the execution of automated driving. Although the operation controller 172 may pull the shift lever 76B into the cover member 76C prior to the vehicle M reaching the starting point of a segment where automated driving is to be executed, there is no limitation thereto, and the operation controller 172 may pull in the shift lever 76B directly after the vehicle M reaches the starting point of a segment where automated driving is to be executed.

Moreover, in the vehicle control system 100, when the vehicle M passes an ending point of a segment where automated driving is executed, the stowing mechanism 76E is used to push out the shift lever 76B to a position where the shift position is able to be manipulated, enabling the shift lever 76B to be transitioned to a state in which manipulation is possible prior to starting the manual driving mode. Note that although the operation controller 172 pushes out the shift lever 76B prior to the vehicle M passing an ending point of a segment where automated driving is executed, there is no limitation thereto, and the shift lever 76B may foe pushed out from the cover member 76C directly after the vehicle M passes an ending point of a segment where automated driving is executed.

Moreover, in the vehicle control system 100, in cases in which an operation pressing the shift lever 76B along the extension direction has been received in a state in which notification of the start of automated driving is being performed, an action to pull in the shift lever 76B along the extension direction using the stowing mechanism 76E is started, enabling the shift lever 76B to be pulled in when the start of automated driving has been permitted by the occupant. As a result, in the vehicle control system 100, occupant unease with regards to the pulling-in of the shift lever 76B can be suppressed.

Moreover, in the vehicle control system 100, a notification prompting an operation to press in the shift lever 76B along the extension direction is performed prior to the vehicle M reaching a starting point of a segment where automated driving is to be executed, thus enabling prompting of an operation to press in the shift lever 76B, and enabling suppression of occupant unease with regards to the pulling-in of the shift lever 76B.

Moreover, in the vehicle control system 100, in cases in which an operation pressing the shift lever 76B along the extension direction has been received while automated driving is being executed, the stowing mechanism 76E is used to push out the shift lever 76B to a position where the shift position is able to be manipulated, the execution of automated driving is suspended, and at least one of speed control or steering control of the vehicle M is switched to manual driving that is executed based on driving operations. In the vehicle control system 100, an override can thereby be implemented by a pressing operation on the shift lever 76B.

Second Embodiment

Explanation follows regarding a second embodiment. The vehicle control system 100 of the second embodiment differs from the vehicle control system 100 of the first embodiment in that the shift lever 76B is pushed out from the cover member 76C in cases in which a pressing operation on the shift lever 76B has been detected when the position of the vehicle M is outside of an automated driving segment. The following explanation focuses on this difference.

Figure 18:
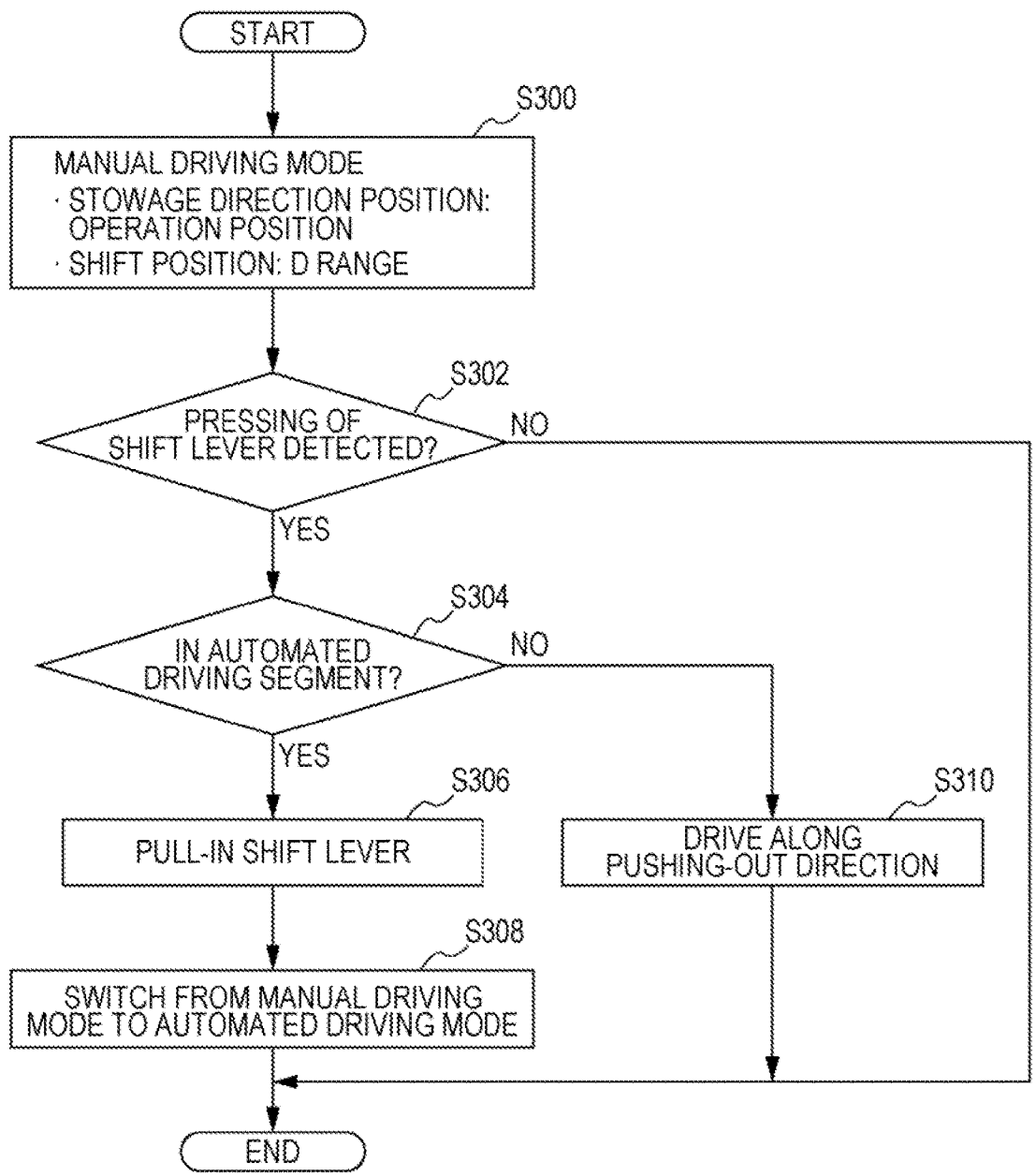
FIG. 18 is a flowchart illustrating a flow of processing when a pressing operation on a shift lever has been received in a manual driving mode.

FIG. 18 is a flowchart illustrating a flow of processing in cases in which a pressing operation on the shift lever 76B has been received in the manual driving mode. The processing of FIG. 18 is repeatedly executed while the vehicle M is traveling in the manual driving mode. In a state in which the stowage direction position of the shift lever 76B is at the operation position Z1 in the manual driving mode, and the shift position is at the D range (driving position) (step S300), the operation controller 172 determines whether or not a pressing operation on the shift lever 76B has been received (step S302). In cases in which a pressing operation on the shift lever 76B has been received, the operation controller 172 determines whether or not the vehicle M is traveling through an automated driving segment (step S304).

In cases in which the vehicle M is traveling through an automated driving segment, the operation controller 172 pulls the shift lever 76B into the cover member 76C using the stowing mechanism 76E (step S306). Next, the operation controller 172 switches the driving mode of the vehicle M from the manual driving mode to the automated driving mode and ends the processing of the flowchart.

In cases in which the vehicle M is not traveling through an automated driving segment, the operation controller 172 moves the shift lever 76B along a pushing-out direction using the stowing mechanism 76E (step S306). Thus, in cases in which a pressing operation is performed on the shift lever 76B in a segment where the driving mode of the vehicle M cannot be switched to the automated driving mode, the operation controller 172 can impart an operation counterforce against the hand of the occupant. The operation controller 172 can thereby inform the occupant that automated driving is not possible.

MODIFIED EXAMPLES

Figure 20:
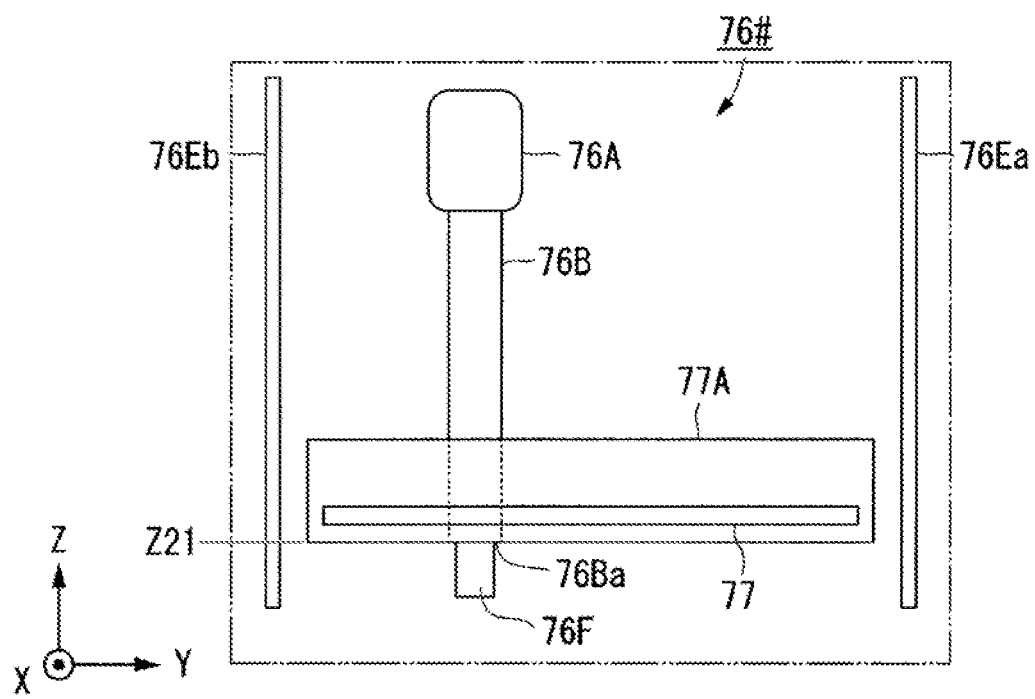
FIG. 20 is a side view illustrating a state in which a shift lever is at a stowed position in the modified example.

Explanation follows regarding a first modified example of the embodiments described above. FIG. 13 is a side view illustrating a state in which a shift lever 76B of a first modified example is at an operation position Z11. FIG. 20 is a side view illustrating a state in which a shift lever 76B in this modified example is at a stowed position Z21. In a shift lever device 76# of the modified example, the shift position sensor 77 and the slide mechanism 77A are pulled into the cover member 76C together, and the shift lever device 76# includes stowing mechanisms 76Ea and 76Eb that perform an action to push out the shift position sensor 77 and the slide mechanism 77A from inside the cover member 76C. The stowing mechanisms 76Ea and 76Eb support both Y direction ends of the slide mechanism 77A, and slide the shift lever device 76# and slide mechanism 77A along the stowage direction.

Figure 19:
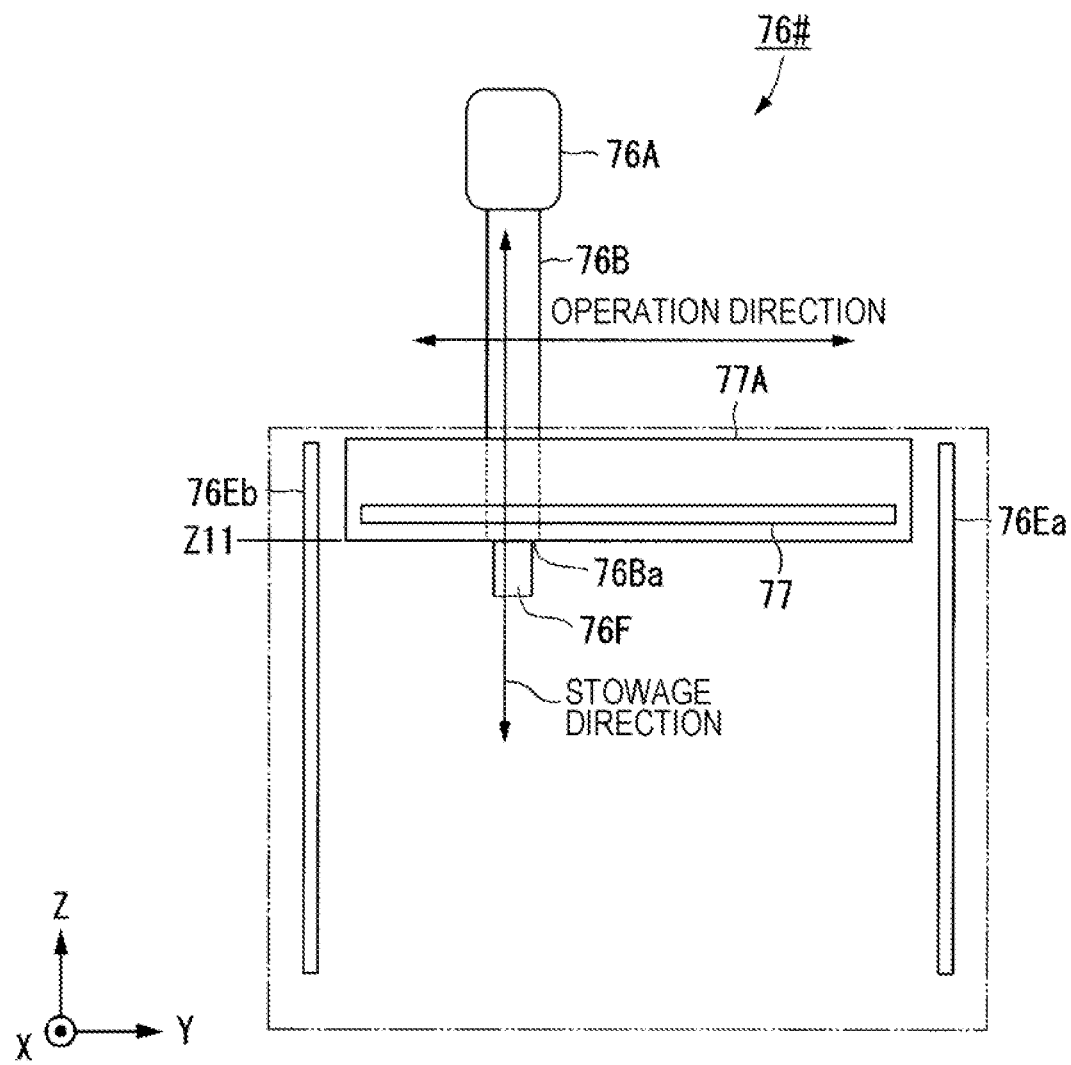
FIG. 19 is a side view illustrating a state in which a shift lever is at an operation position in a modified example.

As illustrated in FIG. 19, in the shift lever device 76# of the first modified example, in cases in which the bottom face 76Ba of the shift lever 76B is at the operation position Z11, the head 76A and the shift lever 76B are exposed from the cover member 76C. As illustrated in FIG. 20, in the shift lever device 76# of the first modified example, in cases in which the bottom face 76Ba of the shift lever 76B is at the stowed position Z21, the head 76A and the shift lever 76B are stowed in the cover member 76C.

Explanation follows regarding a second modified example of the embodiments described above. FIG. 21A and FIG. 21B are side views illustrating a second modified example. FIG. 21A illustrates a state in which operation switches are exposed, and FIG. 21B illustrates a state in which the operation switches are shielded. The shift device of the second modified example includes plural, operation switches 76AD, 76AN, 76AR, and 76AP that receive operations from a vehicle occupant to switch a shift position. The operation switches 76AD, 76AN, 76AR, and 76AP are, for example, provided on a switch platform 76Cb provided to the base of a recess 76Ca of the cover member 76C.

The operation switch 76AD is a switch that receives an instruction to switch the shift position of the vehicle M to a driving position. The operation switch 76AN is a switch that receives an instruction to switch the shift position of the vehicle M to a neutral position. The operation switch 76AR is a switch that receives an instruction to switch the shift position of the vehicle M to a reverse position. The operation switch 76AP is a switch that receives an instruction to switch the shift position of the vehicle M to a park position. The operation switches 76AD, 76AN, 76AR, and 76AP include, for example, contact points that receive a pressing operation from the vehicle occupant as a shift position switching operation.

When automated driving is not being executing by the automated driving controller 120, the operation switches 76AD, 76AN, 76AR, and 76AP are exposed as illustrated in FIG. 21A. When automated driving is being executed by the automated driving controller 120, the operation switches 76AD, 76AN, 76AR, and 76AP are covered by an opening/closing cover 76Cc. In a state in which the operation switches 76AD, 76AN, 76QR, and 76AP are exposed, the opening/closing cover 76Cc is, for example, stowed in the cover member 76C. The opening/closing cover 76Cc is pulled out from the cover member 76C to shield the operation switches 76AD, 76AM, 76AR, and 76AP while automated driving is being executed by the automated driving controller 120.

Note that in the shift device of the second modified example, although the operation switches 76AD, 76AN, 76AR, and 76AP are shielded using the opening/closing cover 76Cc, there is no limitation thereto, and the switch platform 76Cb may be moved further along the –Z direction than the surface of the cover member 76C to shield the operation switches 76AD, 76AN, 76AR, and 76AP.

Figure 22A:
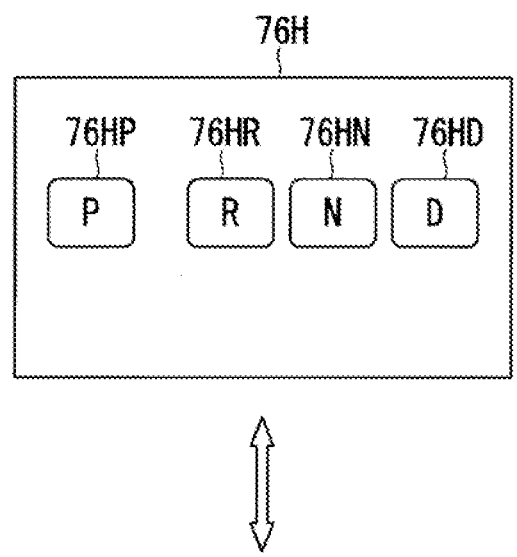
FIGS. 22A and 22B are side views illustrating a third modified example.
Figure 22B:
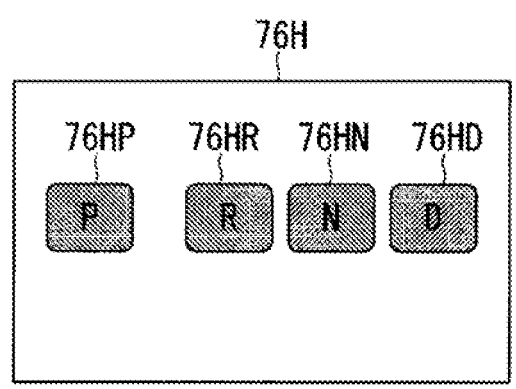

Explanation follows regarding a third modified example of the embodiments described above. FIG. 22A and FIG. 22B are side views illustrating the third modified example. FIG. 22A illustrates a state in which operation buttons are exposed on a shift operation screen, and FIG. 22B illustrates a state in which the operation buttons are shielded on the shift operation screen. In the shift device of the third modified example, plural operation buttons 76HD, 76HN, 76HR, and 76HP that receive operations from a vehicle occupant to switch a shift position are displayed on a shift operation screen 76H that is both visible to and touch-operable by the vehicle, occupant. The shift operation screen 76H may, for example, be the display device 82 provided to the instrument panel, or may be a separate display device from the display device 82.

The operation button 76HD is an image that receives an instruction to switch the shift position of the vehicle M to a driving position. The operation button 76HN is an image that receives an instruction to switch the shift position of the vehicle M to a neutral position. The operation button 76HR is an image that receives an instruction to switch the shift position of the vehicle M to a reverse position. The operation button 76HP is an image that receives an instruction to switch the shift position of the vehicle M to a park position. In the shift device of the third modified example, an instruction to switch the shift position of the vehicle M is received by determining which operation button was selected based on a position of a touch operation on the shift operation screen 76H.

When automated driving is not being executing by the automated driving controller 120, the operation buttons 76HD, 76HN, 76HR, and 76HP are displayed with an image brightness that is clearly visible to the vehicle occupant, as illustrated in FIG. 22A. The operation buttons 76HD, 76HN, 76HR, and 76HP are thereby exposed to the vehicle occupant. When automated driving is being executed by the automated driving controller 120, the operation buttons 76HD, 76HN, 76HR, and 76HP are shielded in a greyed image state, as illustrated in FIG. 22B. The operation buttons 76HD, 76HN, 76HR, and 76HP may be said to have been switched to a greyed-out state. Although the operation buttons 76HD, 76HN, 76HR, and 76HP may be shielded using the greyed images, there is no limitation thereto, and configuration may be such that the shift operation screen 76H itself does not perform display, such that the buttons are shielded so as to be completely out of view, or such that the letters cannot be read.

Explanation follows regarding other modified examples. Although at least a portion of the operation switches in the second modified example and the operation buttons in the third modified example may be shielded, "at least a portion of the operation section being shielded" may include exposing a portion of the shift position. For example, in the vehicle control system 100 of the embodiments, the park position may be exposed while automated driving is being executed by the automated driving controller 120. The vehicle control system 100 thereby enables the vehicle M to be stopped by controlling the traction drive force output device 200 when an operation instructing the park position is received in cases in which automated driving not intended by the vehicle occupant has been performed.

Moreover, in the vehicle control system 100 explained above, although the operation section for operating the shift position may be of a lever-style, a switch-style, or a touch panel-style as describe above, there is no limitation thereto, and the operation section may also be of a dial-style. A dial-style operation section is switched between a state of being exposed from the cover member 76C and a state of being shielded by the cover member 76C by a shielding mechanism described above.

Additionally, in the above embodiments, although the shift device may be provided to a center console disposed between a driving seat and a front passenger seat, there is no limitation thereto, and the shift device may be provided to the instrument panel. In cases in which the shift device is provided to the center console, the direction of movement to shield the above shift lever 76B is in the vertical direction, and the direction in which the shift position is manipulated is in a front-rear direction or lateral direction of the vehicle M crossing the vertical direction. In cases in which the shift device is provided to the instrument panel, the direction of movement to shield the above shift lever 76B is a direction into the instrument panel, and the direction in which the shift position is manipulated is the vertical direction or a width direction of the vehicle M.

Although explanation, has been given regarding, modes for implementing the present disclosure with reference to exemplary embodiments, the present disclosure is not limited by these exemplary embodiments in any way, and various additional modifications and substitutions may be made within a range that does not depart from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

Note that the above embodiments may also foe expressed as the following: a vehicle control system including an automated driving controller configured to execute automated driving by automatically performing at least one of speed control or steering control of a vehicle; a shift lever configured to receive an operation in an operation direction crossing an extension direction of the shift lever as an operation to switch a shift position; a stowing mechanism configured to pull in at least a portion of the shift lever along the extension direction of the shift lever to stow the at least a portion of the shift lever; and a stowing controller configured to operate the stowing mechanism while automated driving is being executed by the automated driving controller.

We claim:

1. A vehicle control system comprising:
   an automated driving controller configured to execute automated driving of a vehicle by automatically performing at least one of speed control and steering control of the vehicle;
   a shift operation reception section configured to receive an operation to switch a shift position of the vehicle; and
   an operation controller configured to limit reception, by the shift operation reception section, of the operation to switch the shift position when the automated driving is executed by the automated driving controller, wherein:
   the shift operation reception section includes an operation section operated by an occupant, and a shielding mechanism that shields at least a portion of the operation section from sight; and
   the operation controller activates the shielding mechanism for shielding when the operation controller limits the reception of the operation to switch the shift position, and
   wherein the automated driving controller starts the automated driving when operation by the shielding mechanism to shield the operation section has been completed.

2. The vehicle control system according to claim 1, further comprising:
   a drive section configured to transmit, to a transmission of the vehicle, the operation to switch the shift position received by the shift operation reception section,
   wherein the operation controller prohibits the drive section from transmitting the operation to the transmission of the vehicle in cases in which the operation is received by the shift operation reception section while the automated driving is being executed by the automated driving controller.

3. The vehicle control system according to claim 1, further comprising:
   a shift position detector configured to electrically detect the operation to switch the shift position of the shift operation reception section,
   wherein the operation controller prohibits the shift position detector from detecting the operation to switch the shift position while the automated driving is being executed by the automated driving controller.

4. The vehicle control system according to claim 1, wherein the shift operation reception section includes a shifter and the operation controller causes the shifter to retract to limit the reception of the operation to switch the shift position.

5. A vehicle control system comprising:
   an automated driving controller configured to execute automated driving of a vehicle by automatically performing at least one of speed control and steering control of the vehicle;
   a shift operation reception section configured to receive an operation to switch a shift position of the vehicle;
   an operation controller configured to limit reception, by the shift operation reception section, of the operation to switch the shift position when the automated driving is executed by the automated driving controller; and
   a shift position detector configured to electrically detect the operation to switch the shift position of the shift operation reception section, wherein:
   the shift operation reception section includes an operation section operated by an occupant, and a shielding mechanism that shields at least a portion of the operation section from sight; and
   the operation controller activates the shielding mechanism for shielding when the operation controller limits the reception of the operation to switch the shift position, and
   wherein the operation controller causes the shielding mechanism to shield the at least the portion of the operation section when the shift position detected by the shift position detector is a driving position, and does not cause the shielding mechanism to shield the at least the portion of the operation section when the shift position detected by the shift position detector is a park position.

6. The vehicle control system according to claim 5, further comprising:
   a drive section configured to transmit, to a transmission of the vehicle, the operation to switch the shift position received by the shift operation reception section,
   wherein the operation controller prohibits the drive section from transmitting the operation to the transmission of the vehicle in cases in which the operation is received by the shift operation reception section while the automated driving is being executed by the automated driving controller.

7. The vehicle control system according to claim 5, wherein the operation controller prohibits the shift position detector from detecting the operation to switch the shift position while the automated driving is being executed by the automated driving controller.

8. A vehicle control system comprising:
   an automated driving controller configured to execute automated driving of a vehicle by automatically performing at least one of speed control and steering control of the vehicle;
   a shift operation reception section configured to receive an operation to switch a shift position of the vehicle;
   an operation controller configured to limit reception, by the shift operation reception section, of the operation to switch the shift position when the automated driving is executed by the automated driving controller; and
   an action plan generation section configured to generate a segment of a route where the automated driving is to be executed by the automated driving controller, wherein:
   the shift operation reception section includes an operation section operated by an occupant, and a shielding mechanism that shields at least a portion of the operation section from sight; and
   the operation controller activates the shielding mechanism for shielding when the operation controller limits the reception of the operation to switch the shift position, and
   wherein the operation controller is configured to start an action to cause the shielding mechanism to shield the at least the portion of the operation section when the vehicle reaches a starting point, set by the action plan generation section, of the segment where automated driving is to be executed.

9. The vehicle control system according to claim 8, wherein:
the operation controller causes the shielding mechanism to expose the at least the portion of the operation section which has been shielded by the shielding mechanism, when the vehicle passes an ending point, set by the action plan generation section, of the segment where automated driving is to be executed.

10. The vehicle control system according to claim 8, further comprising:
a drive section configured to transmit, to a transmission of the vehicle, the operation to switch the shift position received by the shift operation reception section,
wherein the operation controller prohibits the drive section from transmitting the operation to the transmission of the vehicle in cases in which the operation is received by the shift operation reception section while the automated driving is being executed by the automated driving controller.

11. The vehicle control system according to claim 8, further comprising:
a shift position detector configured to electrically detect the operation to switch the shift position of the shift operation reception section,
wherein the operation controller prohibits the shift position detector from detecting the operation to switch the shift position while the automated driving is being executed by the automated driving controller.

12. A vehicle control system comprising:
an automated driving controller configured to execute automated driving of a vehicle by automatically performing at least one of speed control and steering control of the vehicle;
a shift operation reception section configured to receive an operation to switch a shift position of the vehicle;
an operation controller configured to limit reception, by the shift operation reception section, of the operation to switch the shift position when the automated driving is executed by the automated driving controller;
an automated driving notification section configured to perform notification of a start of the automated driving by the automated driving controller; and
an operation detector configured to detect an operation for activating the shielding mechanism to shield or expose the operation section, wherein:
the shift operation reception section includes an operation section operated by an occupant, and a shielding mechanism that shields at least a portion of the operation section from sight; and
the operation controller activates the shielding mechanism for shielding when the operation controller limits the reception of the operation to switch the shift position, and
wherein the operation controller is configured to start an action to cause the shielding mechanism to shield the at least the portion of the operation section when the operation for activating the shielding mechanism to shield the operation section has been detected by the operation detector in a state in which notification of the start of the automated driving is performed by the automated driving notification section.

13. The vehicle control system according to claim 12, further comprising:
an operation notification section configured to perform notification prompting the operation for activating the shielding mechanism to shield the operation section prior to the vehicle reaching a starting point of a segment of a route where the automated driving is to be executed.

14. The vehicle control system according to claim 12, wherein in cases in which the operation for activating the shielding mechanism to expose the at least the portion of the operation section has been detected by the operation detector while the automated driving is being executed by the automated driving controller:
the operation controller causes the shielding mechanism to expose the at least the portion of the operation section being shielded, and
the automated driving controller suspends execution of the automated driving and switches at least one of the speed control or the steering control of the vehicle to manual driving executed based on driving operations by a vehicle occupant.

15. The vehicle control system according to claim 12, wherein:
the operation controller causes the shielding mechanism to expose the operation section when the operation for activating the shielding mechanism to shield the at least the portion of the operation section has been detected by the detection section while a position of the vehicle is outside a segment of a route where the automated driving is to be executed.

16. The vehicle control system according to claim 12, further comprising:
a drive section configured to transmit, to a transmission of the vehicle, the operation to switch the shift position received by the shift operation reception section,
wherein the operation controller prohibits the drive section from transmitting the operation to the transmission of the vehicle in cases in which the operation is received by the shift operation reception section while the automated driving is being executed by the automated driving controller.

17. The vehicle control system according to claim 12, further comprising:
a shift position detector configured to electrically detect the operation to switch the shift position of the shift operation reception section,
wherein the operation controller prohibits the shift position detector from detecting the operation to switch the shift position while the automated driving is being executed by the automated driving controller.

* * * * *